United States Patent [19]
de Souza et al.

[11] Patent Number: 5,884,261
[45] Date of Patent: Mar. 16, 1999

[54] METHOD AND APPARATUS FOR TONE-SENSITIVE ACOUSTIC MODELING

[75] Inventors: Peter V. de Souza, San Jose; Adam B. Fineberg; Hsiao-Wuen Hon, both of Saratoga, all of Calif.; Baosheng Yuan, Kentridge, Singapore

[73] Assignee: Apple Computer, inc., Cupertino, Calif.

[21] Appl. No.: 271,639

[22] Filed: Jul. 7, 1994

[51] Int. Cl.$^6$ ............................................. G10L 9/00
[52] U.S. Cl. ..................... 704/255; 704/207; 704/56
[58] Field of Search ........................ 395/2.65, 2.52, 395/2.16, 2.64, 2.49, 2.63; 381/41–43; 704/256, 243, 255, 254, 240, 205, 206, 207, 208, 209, 200, 241, 242, 216, 217, 218, 263, 265, 266, 268, 267, 269

[56] References Cited

U.S. PATENT DOCUMENTS 4,819,271  4/1989  Bahl et al. ................................ 381/43

OTHER PUBLICATIONS

Alex Waibel, et al., "Readings in Speech Recognition", pp. 308–319, 332–339 and 507–514, Morgan Publishers, Inc. 1990.

Lalit R. Bahl, et al., "A Maximum Likelihood Approach to Continuous Speech Recognition", IEEE, Mar. 1983.

Lalit R. Bahl, et al., "Speech Recognition With Continuous--Parameter Hidden Markov Models", IEEE, Sep./Dec. 1987.

Lalit R. Bahl, et al. "A Tree–Based Statistical Language Model for Natural Language Speech Recognition", IEEE, Jul. 1989.

Hsiao–Wuen Hon, et al., "CMU Robust Vocabulary–Independent Speech Recognition System", IEEE 1991, pp. 889–892.

L. R. Bahl, et al., "Acoustic Markov Models Used in the Tangora Speech Recognition System", IEEE 1988, pp. 497–500.

Chih–Heng Lin, et al., "A New Framework for Recognition of Mandarin Syllables With Tones Using Sub–syllabic Units", IEEE, Apr. 1993, pp. 227–230.

Lin–shan Lee, et al., "Golden Mandarin (II)– An Improved Single–Chip Real–Time Mandarin Dictation Machine for Chinese Langurage With Very Large Vocabulary", IEEE, Apr. 1993, pp. 503–506.

International Conference on Computer Processing of Chinese and Oriental Languages, vol. 5, No. 3–4, Aug. 1991 Taipei,TW, Lee, et al., "System Description of Golden Mandarin 1 Voice Input System For Unlimited Chinese Characters", pp. 314–326. Aug. 1991.

International Conference on Acoustics, Speech and Signal Processing, 1990, vol. 1, 3–6 Apr. 1990 Albuquerque, NM, Lee, et al., "A Real–time Mandarin Dictation Machine For Chinese Language With Unlimited Texts and Very Large Vocabulary", pp. 65–68, Apr. 1990.

(List continued on next page.)

*Primary Examiner*—Richemond Dorvil
*Attorney, Agent, or Firm*—Blakely, Sokoloff, Taylor & Zafman

[57] ABSTRACT

Tone-sensitive acoustic models are generated by first generating acoustic vectors which represent the input data. The input data is separated into multiple frames and an acoustic vector is generated for each frame which represents the input data over its corresponding frame. A tone-sensitive parameter is then generated for each of the frames which indicates the tone of the input data at its corresponding frame. Tone-sensitive parameters are generated in accordance with two embodiments. First, a pitch detector may be used to calculate a pitch for each of the frames. If a pitch cannot be detected for a particular frame, then a pitch is created for that frame based on the pitch values of surrounding frames. Second, the cross covariance between the autocorrelation coefficients for each frame and its successive frame may be generated and used as the tone-sensitive parameter. Feature vectors are then created for each frame by appending the tone-sensitive parameter for a frame to the acoustic vector for the same frame. Then, using these feature vectors, acoustic models are created which represent the input data.

27 Claims, 13 Drawing Sheets

OTHER PUBLICATIONS

International Conference on Speech, Image Processing and Neural Networks, 1994, vol. 2, 13–16 Apr. 1994 Hong Kong, HK, Tianying, et al., A Method for Chinese Syllables Recognition Based Upon Sub–syllable Hidden Markov Model:, pp. 730–733, Apr. 1994.

Proceedings Tencon '93, IEEE Region 10 Conference on Computer, Communication, Control and Power Engineering, IEEE Region 10 Interantional Conference on Computers, Communications and Automation, vol. 3, 19–21, Oct. 1993 Beijing, CH, Chang, et al., "A Segment–based Speech Recognition System For Isolated Mandarin Syllables", pp. 317–320—Oct. 1993.

METHOD AND APPARATUS FOR TONE-SENSITIVE ACOUSTIC MODELING

BACKGROUND OF THE INVENTION

1. Field of the Invention

The present invention pertains to pattern recognition. More particularly, this invention relates to tone-sensitive acoustic modeling for speech recognition.

2. Background

In acoustic modeling, Markov models (MMs) are often used. When a MM system is built, each unit (e.g., word, syllable, phrase, etc.) in the recognizable vocabulary is defined as a sequence of sounds, or a fragment of speech, that resembles the pronunciation of the unit. A MM for each fragment of speech is created. The MM, for each of the sounds are then concatenated together to form a sequence of MMs that depict an acoustical definition of the unit in the vocabulary. For example, in FIG. 1A a phonetic word 100 for the word "CAT" is shown as a sequence of three phonetic Markov models, 101–103. One of the phonetic Markov models represents the phoneme "K" (101), having two transition arcs 101A and 101B. A second of the phonetic Markov models represents the phoneme "AH" (102), having transition arcs 102A and 102B. The third of the phonemes 103 represents the phoneme "T" having transition arcs 103A and 103B.

Each of the three Markov models shown in FIG. 1A have a beginning state and an ending state. The "K" model 101 begins in state 104 and ends in state 105. The "AH" model 102 begins in the state 105 and ends in state 106. The "T" model 103 begins in state 106 and ends in state 107. During recognition, an utterance is compared with the sequence of phonetic Markov models, starting from the leftmost state, such as state 104, and progressing according to the arrows through the intermediate states to the rightmost state, such as state 107, where the model 100 terminates in a manner well-known in the art. The transition time from the leftmost state 104 to the rightmost state 107 reflects the duration of the word. Therefore, to transition from the leftmost state 104 to the rightmost state 107, time must be spent in the "K" state, the "AH" state, and the "T" state to result in a conclusion that the utterance is the word "CAT". Thus, a MM for a word is comprised of a sequence of models corresponding to the different sounds made during the pronunciation of the word.

Construction of MMs for other units, such as syllables or phrases, is analogous to the above discussion. That is, a MM analogous to the model 100 could be generated for any desired unit, such as syllables or phrases.

Each of the three Markov models shown in FIG. 1A represents a phoneme ("K", "AH", and "T"). These phonemes are often made up of multiple states. For example, the phoneme "K" (101) may actually be comprised of three different states, as shown by phonetic model 109 in FIG. 1B. These three states, 114, 115 and 116 represent the phoneme states $K_1$ (110), $K_2$ (111) and $K_3$ (112), respectively. Combined together, the phoneme states $K_1$ (110), $K_2$ (111) and $K_3$ (112) represent the phoneme "K". Multiple arcs are shown connecting the three states 114–116, analogous to the arcs connecting phonemes 101–103 in FIG. 1A.

In order to build a Markov model such as those described in FIGS. 1A and 1B, a pronunciation dictionary is often used to indicate the component sounds. A wide variety of dictionaries exist and may be used. The source of information in these dictionaries is usually a phonetician. The component sounds attributed to a particular unit as depicted in the dictionary are based on the expertise and senses of the phonetician. Since phoneticians are human, pronunciations may differ from one phonetician to the next, or errors may exist in the dictionary. Furthermore, phonetic models such as model 109 of FIG. 1B are based on the of the phonetician; phonetic models may not actually represent the unit sought to be depicted. For example, a phonetician may believe the phoneme "K" should transition through the states shown in FIG. 1B, however, when an input utterance is aligned to the Markov models, it may be discovered that the actual utterance desires to transition through the states 124, 125 and 126 representing the fenones of $K_1$, $K_2$, and $dH_3$, as shown in FIG. 1C. Such an alignment, however, is not possible using the phonetic model 109 of FIG. 1B because from state 115, the model transitions to either state 115 or state 116. The option to transition to a state for $dH_3$ does not exist.

Fenonic models can be used to resolve this problem. Fenonic models are generally created by having a speaker read training data into the system. The training data is aligned to generate fenonic models based on the actual acoustic data obtained from the speaker, rather than on the expertise of a phonetician. This approach is often referred to as a data-driven approach. The use of fenonic models in a data-driven approach allows the system to build Markov models which actually represent the data being depicted, such as the fenonic model 120 shown in FIG. 1C.

Fenonic models can be used to generate larger phonetic models (or syllable models, or word models, etc.). This is done by combining the fenonic models. For example, the "K" phoneme (101) of FIG. 1A may be replaced by the fenonic model 120 shown in FIG. 1C.

One concern raised in acoustic modeling systems is the existence of certain languages which are tone-dependent, or tone-sensitive. Many languages are tone-insensitive, such as English. That is, words in English generally have the same meaning regardless of the tone they are spoken with.

However, other languages, such as Mandarin, are tone-sensitive. For example, the symbol "ma" in Mandarin has two distinct meanings dependent on whether it is spoken in a monotone or with a rising pitch.

Thus, it would be advantageous to provide a system which accurately modeled tone-sensitive languages. The present invention provides such a system.

One prior art method of modeling tone-sensitive languages utilizes a two-step process. In the first process the method attempts to determine what syllable or word (or similar unit) was spoken. In the second process, the method attempts to determine the pitch of the syllable or word (or similar unit) that was spoken. The results of these two processes are then combined in an attempt to recognize what was spoken. Thus, two distinct recognition processes are utilized: the first attempts to recognize the syllable or words while the second process attempts to recognize the tone of that syllable or word.

This type of two-process method has several disadvantages. First, additional system time and resources are required due to the additional time involved in running two separate processes. In addition, multiple-process systems suffer in performance as they find a local optimum solution for each process and then combine them, as opposed to finding a unified global optimum result.

Another prior art method of modeling tone-sensitive languages utilizes the same system for tone-dependent languages as used for tone-independent languages. Proponents of this type of method often claim that a specialized tone-dependent system is not necessary, arguing that tone-independent systems recognize tone-sensitive languages efficiently without modification. However, such systems generally produce an unacceptably high error rate.

The present invention provides a solution to the problems of the prior art.

SUMMARY OF THE INVENTION

The present invention comprises a method and apparatus for tone-sensitive acoustic modeling.

Tone-sensitive acoustic models are created by first generating acoustic vectors which represent the input data. The input data is separated into multiple frames and an acoustic vector is generated for each frame, which represents the input data over its corresponding frame. A tone-sensitive parameter(s) is then generated for each of the frames which indicates either the pitch or tone of the input data at that frame. Feature vectors are created for each frame by appending the tone-sensitive parameter(s) for a frame to the acoustic vector for the same frame. Then, using these feature vectors, acoustic models are created which represent the input data. These acoustic models are tone-sensitive.

In one embodiment, tone-sensitive parameters are generated by using a pitch detector to calculate a pitch for each of the frames. If a pitch cannot be detected for a particular frame, then a pitch is created for that frame based on the pitch values of surrounding frames.

In another embodiment, tone-sensitive parameters are generated by calculating the autocorrelation coefficients for the input data of each frame. The cross covariances between the autocorrelation coefficients for each frame and its successive frame is then calculated. These cross covariances provide an indication of the tone of the input data.

BRIEF DESCRIPTION OF THE DRAWINGS

The present invention is illustrate d by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

THE SYSTEM OF THE PRESENT INVENTION

The present invention can operate effectively on a desktop computer system, such as a Macintosh™ personal computer available from Apple Computer Inc., of Cupertino, Calif.

Figure 1A:
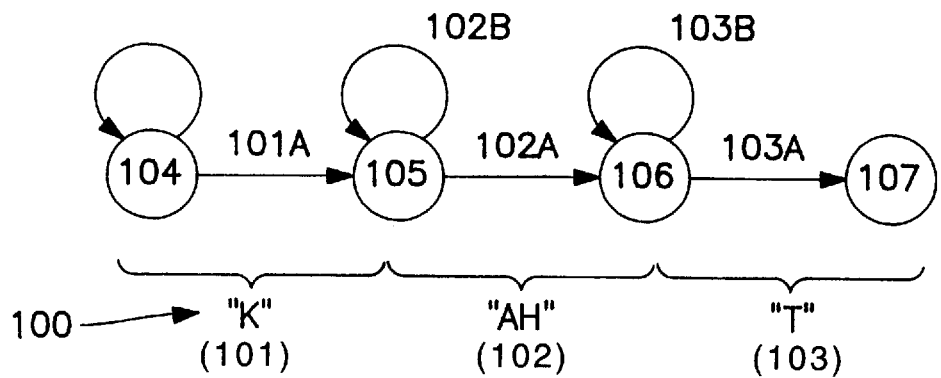
FIG. 1A illustrates an example of the phonetic pronunciation of the word "CAT" as a sequence of Markov models.
Figure 1B:
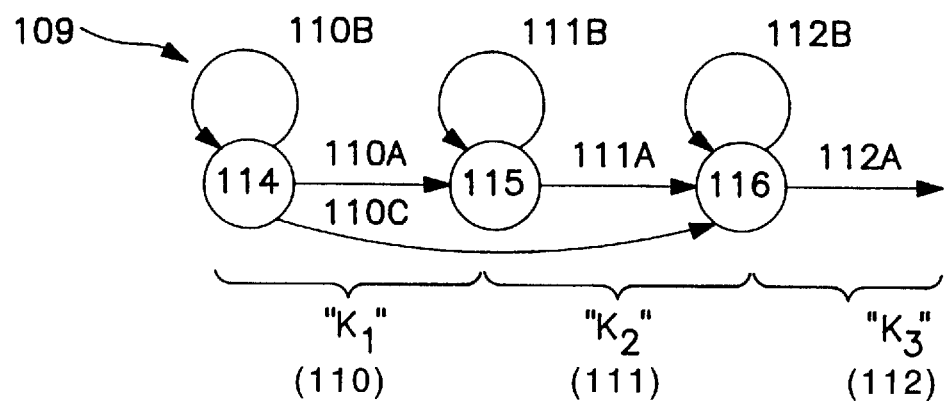
FIG. 1B illustrates an example of a phonetic Markov model for the phoneme "K"
Figure 1C:
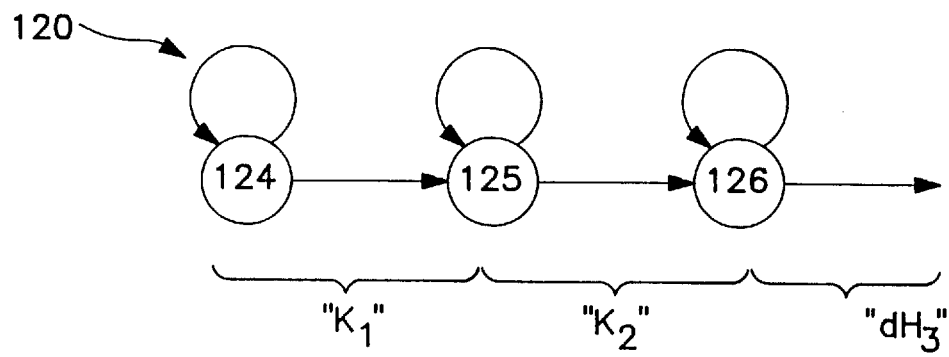
FIG. 1C illustrates an example of a fenonic model for the phoneme "K"
Figure 2:
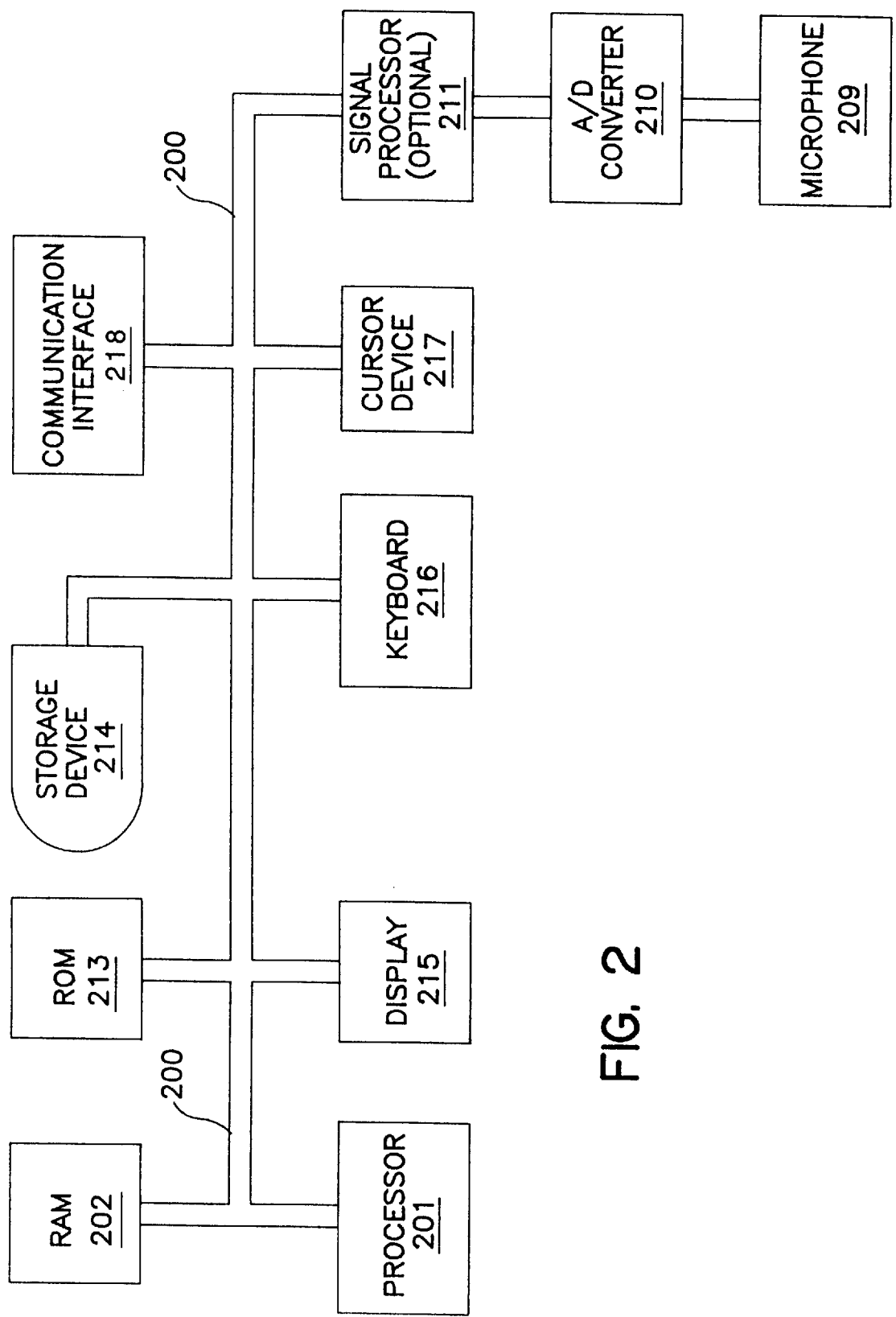
FIG. 2 is a block diagram of an exemplary computer system of the present invention.

In general, computer systems used by the preferred embodiment of the present invention, as illustrated in block diagram format in FIG. 2, comprise a bus 200 for communicating information, a central processor 201 coupled with the bus for processing information and instructions, a random access memory 202 coupled with the bus 200 for storing information and instructions for the central processor 201, a read only memory 213 coupled with the bus 200 for storing static information and instructions for the processor

201, a data storage device 214 such as a magnetic disk and disk drive coupled with the bus 200 for storing information (such as audio or voice data) and instructions, a display device 215 co pled to the bus 200 for displaying information to the computer user, an alphanumeric input device 216 including alphanumeric and function keys coupled to the bus 200 for communicating information and command selections to the central processor 201, a cursor control device 217 coupled to the bus for communicating user input information nd command selections to the central processor 201, and a communication interface 218 coupled to the bus 200 for communicating command selections to the processor 201.

In the present invention the communication interface 218 includes, as an input device, a standard microphone to input audio or voice data to be processed and stored by the computer system. The communication interface 218 includes an analog to digital (A/D) converter to transform analog voice data to digital form which can be processed by the computer system. The communication interface 218 also includes a tape cassette player to input stored voice or audio data into the central processor 201 and the remainder of the system over bus 200. The communication interface 218 also includes, as an output device, a standard speaker realizing the output audio from input signals from the computer system. Communication interface 218 also includes well known audio processing hardware to transform digital audio data to audio signals for output to the speaker, thus creating an audible output.

The display device 215 utilized with the computer system and the present invention may be a liquid crystal device, cathode ray tube, or other display device suitable for creating graphic images and alphanumeric characters (and ideographic character sets) recognizable to the user. The cursor control device 217 allows the computer user to dynamically signal the two dimensional movement of a visible symbol (pointer) on a display screen of the display device 215. Many implementations of the cursor control device are known in the art including a trackball, mouse, joystick or special keys on the alphanumeric input device 215 capable of signaling movement of a given direction or manner of displacement. It is to be appreciated that the cursor also may be directed and/or activated via input from the keyboard using special keys and key sequence command. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist of any of those described above and specifically is not limited to the mouse cursor device.

The present invention also includes a standard microphone 209 to input audio or voice data to be processed and stored by the computer system, and an A/D converter 210 coupled to the microphone 209 and the bus 200 to transform analog voice data from the microphone 209 to digital form which can be processed by the computer system. The microphone 209 and A/D converter 210 may be in place of, or in addition to, the microphone and A/D converter included in communication interface 218.

The present invention may also optionally include a signal processor 211 coupled to the analog to digital converter 210 and the bus 200 for preliminary processing of the voice data before it is communicated to the processor 201 and the rest of the system over bus 200.

PROCESS OF THE PRESENT INVENTION

The present invention utilizes pitch and/or tone to generate tone-sensitive acoustic models. The pitch of speech at any particular moment is generally defined in terms of the fundamental frequency of the speech at that particular moment. Typical frequencies range between 50 Hz and 2000 Hz, depending on the gender and age of the speaker. The tone of speech is generally defined as the pitch value as it changes over time.

Figure 3:
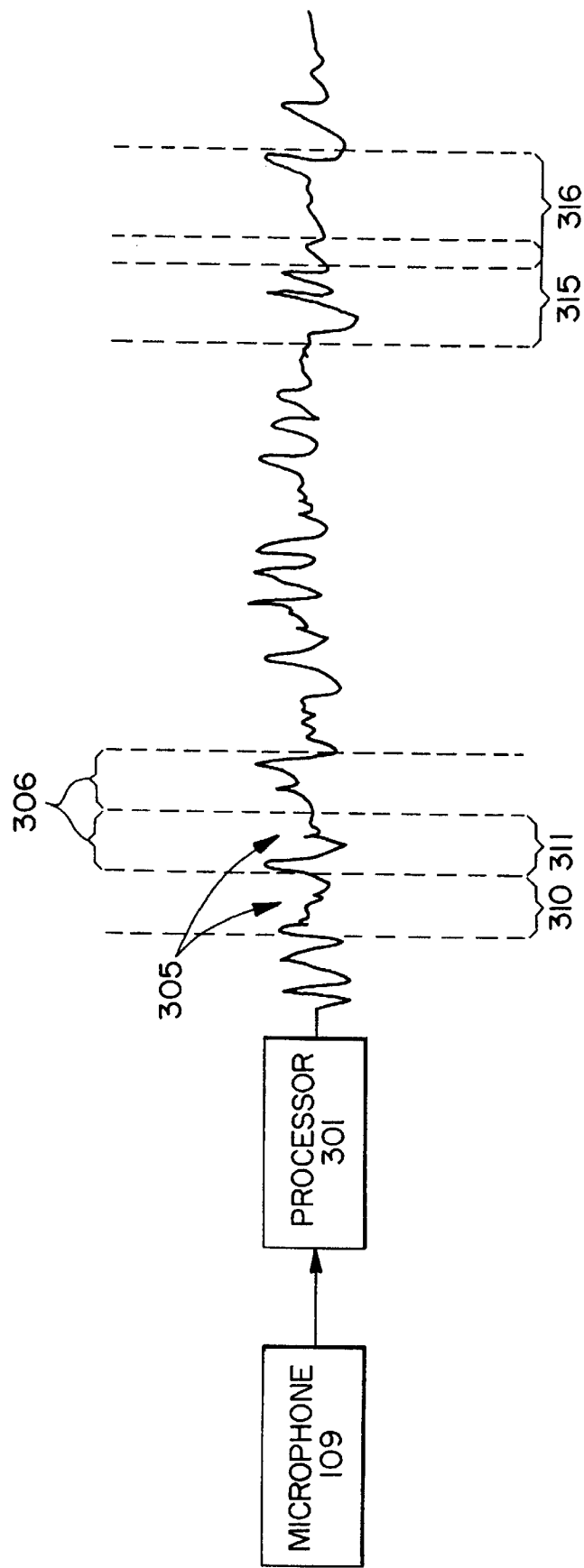
FIG. 3 is a diagram of an utterance which may be input into the present invention.

FIG. 3 is a diagram of an exemplary utterance which may be input into the present invention. The utterance is input to the present invention using, for example, the microphone 209 of FIG. 2. The processor 301 samples the input utterance and transforms it to a set of observed vectors 305, with each observed vector 305 corresponding to individual time frames 306. Processor 301 may be the central processor 201 or the signal processor 211 of FIG. 2.

Each time frame 306 of FIG. 3 represents a predetermined portion of the utterance. In one embodiment of the present invention, this predetermined portion is 10 ms. However, it should be understood by those skilled in the art that other time intervals may be used. In one embodiment of the present invention, time frames 306 are adjacent to one another, such as frames 310 and 311. In an alternate embodiment, time frames 306 overlap each other, as shown by frames 315 and 316.

Figure 4:
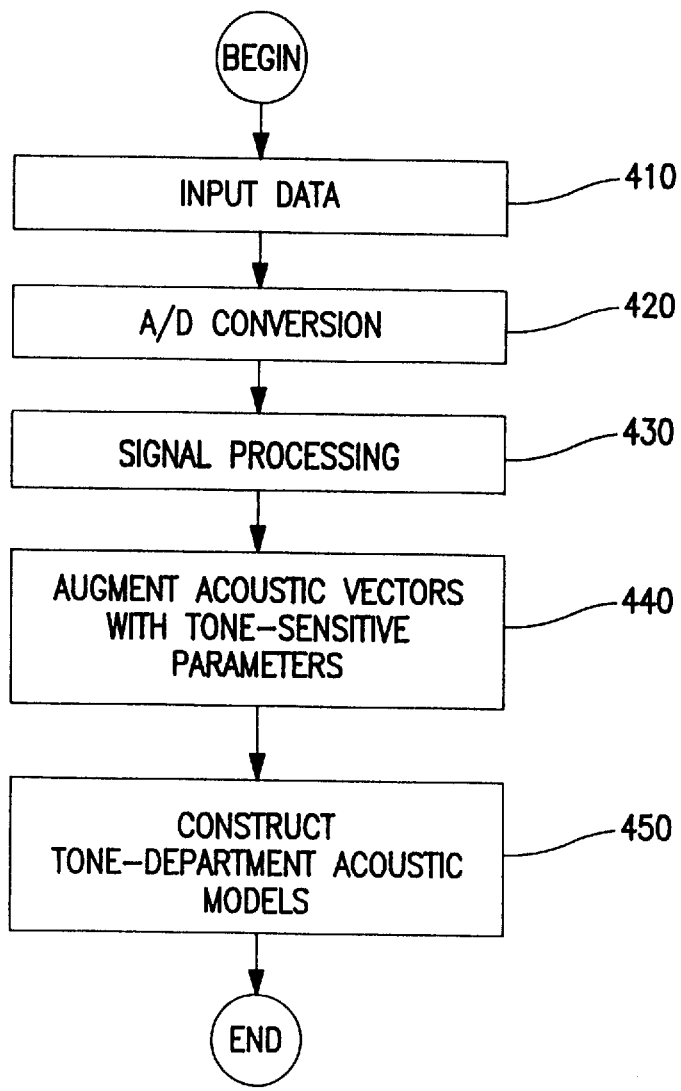
FIG. 4 is a flowchart depicting one embodiment of the process of creating tone-sensitive acoustic models according to the present invention.

FIG. 4 is a flowchart depicting one embodiment of the process of creating tone-sensitive acoustic models according to the present invention. Input data, e.g. an utterance, is introduced to the computer system at step 410. The form of this input may vary. For example, the input may be voice data from a live speaker or a recorded voice. This input data may be any of a wide range of input data. For example, the utterance could comprise a single word or syllable (or whatever unit the user of the present invention desires to model); alternatively, the utterance could represent a string of words or syllables.

Upon receiving input data, for example an utterance from an individual, the system transforms the analog voice data signals to digital form at step 420. This signal, in digital form, can then be processed by the computer system of the present invention.

In step 430, the utterance (in digital form) is processed. A specialized signal processor is optional; for example, if the computer system contains a signal processor 211 it may be employed to process the utterance, thereby alleviating the central processor 201 of the task. In systems where no signal processor exists, or one exists but is not utilized, the central processor 201 performs the task. Regardless of which processor performs the task, the utterance (in digital form) is processed by being sliced in increments along the time dimension, as discussed above with reference to FIG. 3. Typically, the utterance is divided into 100 equal slices per second, thereby creating 100 frames of equal duration. However, the duration of a single frame may vary from system to system and, in addition, the number of frames per second may also vary. The number of frames per second given above is exemplary and not intended to limit the scope of the present invention. Furthermore, it will be understood by those skilled in the art that the utterance can be sliced in unequal increments along the time dimension.

Each slice is then converted into vector, referred to as an observed vector, the creation of which is well known in the art. An observed vector, in one form, represents a summary of the utterance data for a given time slice. For instance, such a vector may consist of signal intensity or numerical energy data over a given set of frequency ranges. However, the types of observed vectors known to the art and their formats are great and any number will operate effectively within the scope and spirit of the present invention. In one embodiment of the present invention, each observed vector comprises a predefined number of samples.

An acoustic vector is then calculated for each frame. Acoustic vectors may be calculated in any of a wide variety of manners which are well known in the art. In one embodiment of the present invention, the acoustic vectors comprise well-known cepstral coefficients.

After generating acoustic vectors for each frame in the utterance, tone-sensitive parameters are generated to augment the acoustic vectors, step 440. In one embodiment of the present invention, tone-sensitive parameters are generated for each frame which provide an indication of the tone in each frame of the utterance. The tone-sensitive parameter for a given frame is then appended to the acoustic vector for that frame, thereby creating a larger feature vector. The generation of tone-sensitive parameters is discussed in more detail below with reference to FIGS. 5 and 6.

Tone-dependent acoustic models are then constructed, step 450. The feature vectors from step 440 are used to construct phonetic or fenonic models which are trained to the data. Since these feature vectors contain tone-sensitive parameters, the resultant acoustic models account for tone in the utterance. The construction of tone-dependent acoustic models is discussed in more detail below with reference to FIGS. 7 through 11D.

GENERATION OF TONE-SENSITIVE PARAMETERS

Tone-sensitive parameters are generated by the present invention to provide tone-sensitive acoustic models. Two embodiments of the present invention for generating these parameters are discussed below. Either embodiment may be utilized, either alone or in combination. The first process, shown in FIG. 5, generates the tone-sensitive parameters based on the pitch value detected by a pitch detector for each frame. The second process, shown in FIG. 6, generates the tone-sensitive parameters by calculating the autocorrelation coefficients for each of the frames. The cross covariance between the autocorrelation coefficients for each frame and its successive frame is then calculated. This cross covariance is a vector which is then appended to the acoustic vector for that frame.

Figure 5:
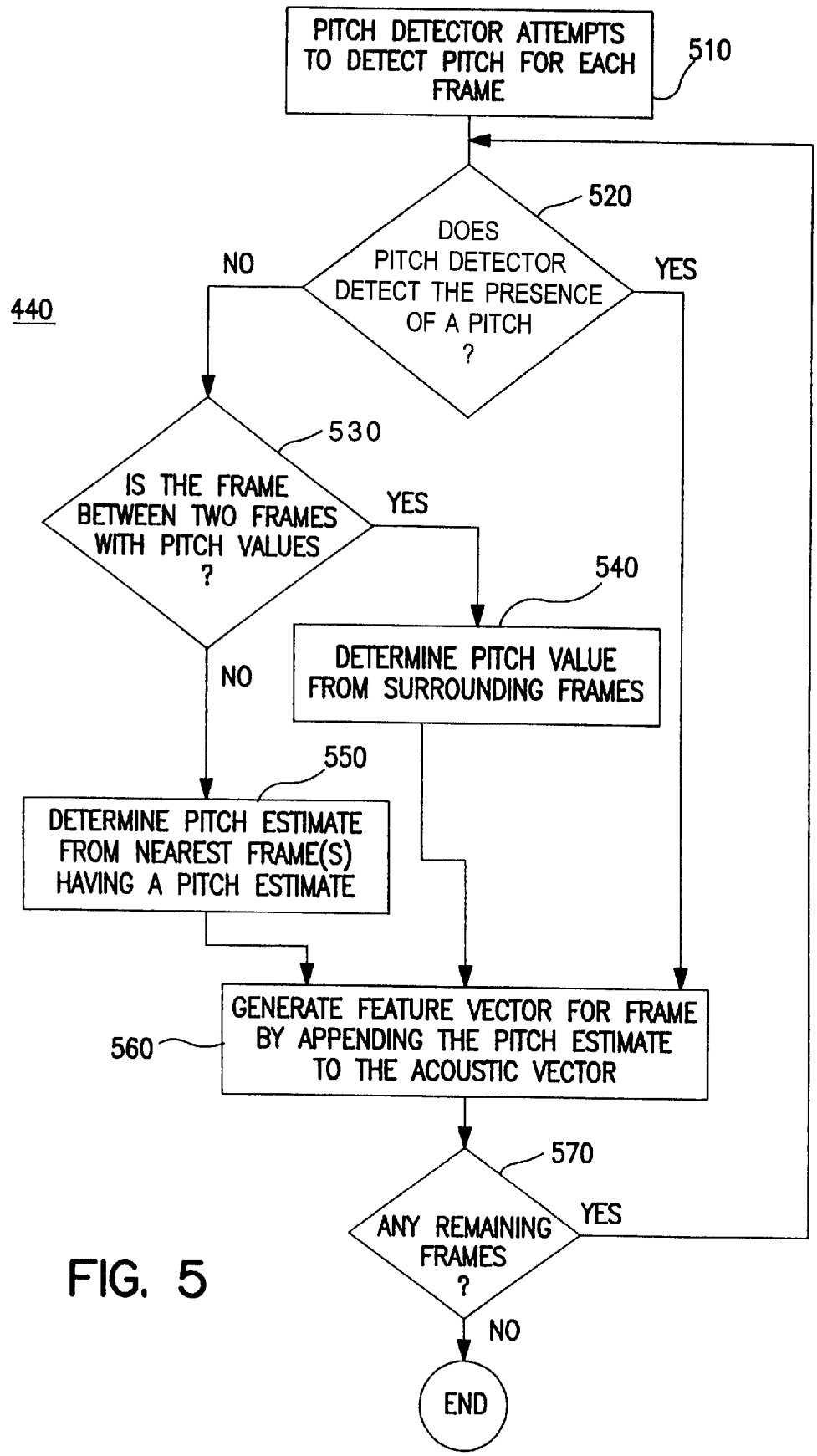
FIG. 5 is a flowchart showing the process of generating tone-sensitive parameters according to one embodiment of the present invention.

FIG. 5 is a flowchart showing the process of generating tone-sensitive parameters (step 440 of FIG. 4) according to one embodiment of the present invention. A pitch detector is utilized in this embodiment to detect the presence of pitch for each frame in the utterance. The pitch detector indicates, for each frame, either the pitch value detected, or that a pitch could not be determined. The pitch value is generally represented by a single number indicating the fundamental frequency of the utterance at that particular frame. The pitch detector may be included within either signal processor 211 or processor 201 of FIG. 2, or may be a stand-alone device. Any of a wide variety of conventional pitch detectors may be utilized by the present invention to detect the pitch of a particular frame.

Returning to FIG. 5, the pitch detector attempts to determine a pitch for each frame in the utterance, step 510. Under certain circumstances, the pitch detector may not be able to determine a pitch for a particular frame. For example, a frame where no speech exists will not have a pitch. Alternatively, the pitch detector may not be able to accurately or reliably determine a pitch. In such a situation, the pitch detector does not return a pitch value for that frame.

Generating a tone-sensitive parameter for a particular frame of the utterance in this embodiment involves first determining whether the pitch detector detects the presence of a pitch, step 520. If the presence of a pitch is detected, then that pitch value detected is used as the tone-sensitive parameter. This pitch value is appended to the acoustic vector to create the larger feature vector for this frame, step 560. For example, the feature vector could be the acoustic vector with the pitch value added as the last element in the feature vector.

Returning to step 520, if the pitch detector does not detect the presence of a pitch, then the system determines whether this particular frame is between two frames that each have a pitch value, step 530. If the frame is surrounded by two frames with pitch values, then the pitch value for this frame is determined based on the two surrounding frames, step 540. For example, if this particular frame is frame(10) in the utterance and the pitch detector was unable to determine a pitch for frame(10), then the pitch value for frame(10) is determined based on the pitch values of frame(9) and frame(11), if frame(9) and frame(11) have pitch values. If frame(11) does not have a pitch value, then the pitch value for frame(10) is determined based on the pitch values of frame(9) and frame(12), if frame(9) and frame(12) have pitch values.

In one embodiment of the present invention, pitch values for frames where the pitch detector was unable to determine a pitch are calculated using interpolation based on the surrounding frames with pitch values. In one implementation, this interpolation is linear; however, it should be readily apparent to those skilled in the art that a wide variety of interpolation techniques may be utilized.

After determining a pitch value in step 540, the present invention generates a feature vector, step 560, based on the pitch value determined in step 540.

Returning to step 530, if this particular frame is not between two frames with pitch values, then a pitch value cannot be calculated based on the surrounding pitch values. For example, if this particular frame is the first frame of an utterance and the pitch detector cannot determine a pitch for the frame, then no previous frame exists upon which a pitch value may be based. Similarly, if this particular frame is the last frame of an utterance, then no subsequent frame exists. Under such circumstances, this embodiment determines the pitch value based on the nearest frame(s) having a pitch estimate, step 550. That is, the pitch value is determined based on the closest frame(s) having a pitch value. For example, the pitch value for the first frame(s) in an utterance is based on the closest frame with a pitch value subsequent to the first frame in the time dimension. Similarly, the pitch value for the last frame in an utterance is based on the closest frame(s) with a pitch value preceding the last frame in the time dimension.

In one implementation of the present invention, the pitch values for the beginning and ending frames of an utterance are copied from the nearest frame with a pitch value. For example, if the pitch detector cannot determine a pitch value for frame(1) and frame(2), but determines a pitch value of x for frame(3), then the pitch values for frame (1), frame(2) and frame(3) are all x.

In an alternate implementation of the present invention, the pitch values for the beginning and ending frames of an utterance are extrapolated from the nearest frames with pitch values.

Once a pitch value is determined for a particular frame in step 550, the present invention generates a feature vector, step 560, based on the pitch value determined in step 540.

This process is repeated for each frame in the utterance, as shown by step 570. If any additional frames remain in the utterance, then the system returns to step 520 to repeat the above steps. However, if no frames remain in the utterance, then the process is completed (for this utterance).

In one embodiment of the present invention, the process of FIG. 5 is performed after the entire utterance is received. In this embodiment, at the completion of the utterance, pitch value are determined for each frame and feature vectors are generated.

In an alternate embodiment of the present invention, the process of FIG. 5 is performed as the utterance is received. In this embodiment, if a pitch is detected present for a particular frame, then a feature vector is generated for that frame. If a pitch is no detected present for a particular frame, then a pitch value is determined and a feature vector generated for that frame as soon as the parameters for a pitch value are available. That is, as soon as pitch values for the surrounding frame(s) are detected, as described above.

It should be noted that the process of FIG. 5 generates a pitch value for each frame of the utterance. This includes frames where a pitch value was detected as well as frames where no pitch value was detected. This results in generating a pitch value for those frames representing silence between words. This embodiment of the present invention relies on the acoustic modeling to utilize the acoustic vectors to determine that the frame actually represents silence, and that the pitch value associated with the silent frames is not indicative of speech.

Figure 6:
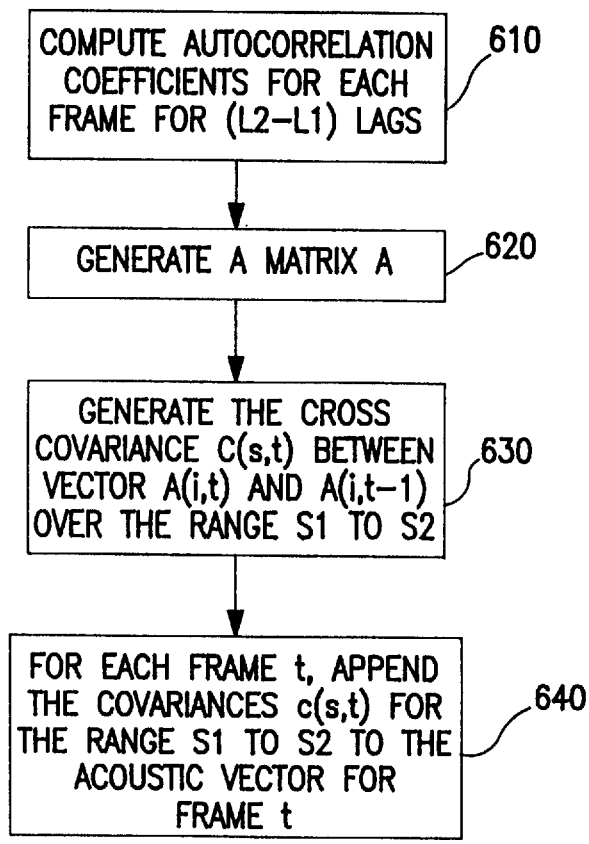
FIG. 6 is a flowchart showing the process of generating tone-sensitive parameters according to another embodiment of the present invention.

FIG. 6 is a flowchart showing the process of generating tone-sensitive parameters (step 440 of FIG. 4) according to an alternate embodiment of the present invention. In this embodiment, autocorrelation functions for each frame in the utterance are calculated for a predetermined number of lags of the autocorrelation functions, step 610. A lag is defined as a time delay; the autocorrelation coefficient for a lag $\tau$ of a signal represents time delaying the signal for $\tau$ units (e.g., in an observed vector of the present invention, one unit corresponds to one element of the vector).

The autocorrelation functions are determined according to the following formula:

$$R_{XX}(\tau) = \sum_{k=0}^{N-1} x(k) \cdot x(k+\tau) \quad (1)$$

where $R_{xx}(\tau)$ is the autocorrelation coefficient for lag $\tau$, $x(k)$ is the sample k of the sampled speech signal x for one frame (i.e., the observed vector), and N is the number of samples in the observed vector.

In one embodiment of the present invention, the predetermined number of lags is based on the number of points on the input signal (i.e., the input data) which are sampled in one second. This is shown by the following formulas:

$$\text{number of lags} = L1 - L2 \quad (2)$$

$$L1 = (0.0125) \cdot R \quad (3)$$

$$L2 = (0.005) \cdot R \quad (4)$$

where R is the number of input signal points sampled in one second. In one mode of operation, R is 16,000. However, it should be readily apparent to those skilled in the art that this value may be increased or decreased. In addition, the coefficients used to determine the values for L1 and L2 may be changed.

Thus, in one embodiment of the present invention, the autocorrelation functions for each frame are determined over a range of 120 lags.

After computing the autocorrelation coefficients for each frame in step 610, a matrix A is generated, step 620. The matrix A comprises the autocorrelation coefficients generated in step 610 for each frame in the utterance. Thus, matrix A is a two-dimensional matrix having a dimension of the number of lags by the number of frames. Matrix A is shown below.

$$\begin{bmatrix} R_{x_0 x_0}(l_1) & \ldots & R_{x_0 x_0}(l_b) & \ldots & R_{x_0 x_0}(l_2) \\ R_{x_1 x_1}(l_1) & \ldots & R_{x_1 x_1}(l_b) & \ldots & R_{x_1 x_1}(l_2) \\ R_{x_2 x_2}(l_1) & \ldots & R_{x_2 x_2}(l_b) & \ldots & R_{x_3 x_3}(l_2) \\ R_{x_3 x_3}(l_1) & \ldots & R_{x_3 x_3}(l_b) & \ldots & R_{x_3 x_3}(l_2) \\ \cdot & & \cdot & & \cdot \\ \cdot & & \cdot & & \cdot \\ \cdot & & \cdot & & \cdot \\ R_{x_{n-1} x_{n-1}}(l_1) & \ldots & R_{x_{n-1} x_{n-1}}(l_b) & \ldots & R_{x_{n-1} x_{n-1}}(l_2) \end{bmatrix}$$

From the matrix A the cross covariance C(s,t) between vectors A(i,t) and A(i,t−1) is generated over the range S1 to S2, step 630, for i from 0 to n−1, where n represents the number of frames in the utterance being processed. The cross covariance C(s,t) is generated according to the following formula:

$$C(s, t) = \frac{1}{m-1} \cdot \left[ \sum_{k=0}^{L1-L2} R_{x_t x_t}(k) \cdot R_{x_{t-1} x_{t-1}}(k+s) - \frac{1}{m} \cdot \sum_{k=0}^{L1-L2} R_{x_t x_t}(k) \cdot \sum_{k=0}^{L1-L2} R_{x_{t-1} x_{t-1}}(k+s) \right] \quad (5)$$

where C(s,t) is the cross covariance for lag s, $R_{x_t x_t}$ is the auto correlation function for time t, k ranges over all computed auto correlation lags, and m is the number of actual lags used in the summation. The cross covariance is generated over the range S1 to S2. Under certain circumstances, the actual number of lags used in the summation is less than L1−L2. That is, $R_{x_{t-1} x_{t-1}}$(k+s) will not exist when s is sufficiently large; thus, the auto correlations for those lags are not included in the cross covariance.

The values S1 and S2 dictate the range over which the cross covariance is calculated. Thus, the larger the range the larger the cross covariance vector for each frame in the utterance. In one embodiment of the present invention:

$$S1 = 0.0003125 \cdot R, \text{ and } S2 = -S1 \quad (6)$$

where R is the number of input signal points sampled in one second. In one implementation of the present invention, R is 16,000. Given these values for the cross covariances of each vector in the matrix A, a matrix C can be calculated, as shown below:

$$\begin{bmatrix} C(S2, 1) & \ldots & C(0, 1) & \ldots & C(S1, 1) \\ C(S2, 2) & \ldots & C(0, 2) & \ldots & C(S1, 2) \\ \cdot & & \cdot & & \cdot \\ \cdot & & \cdot & & \cdot \\ \cdot & & \cdot & & \cdot \\ C(S2, n-1) & & C(0, n-1) & & C(S1, n-1) \end{bmatrix}$$

It can be seen from matrix C and equation (5) above that the cross covariance for a given frame is calculate based on the current frame and the previous frame. For example, the cross covariance vector for frame 1 (i.e., at t=1, where t begins at 0) is determined from the first two rows of Matrix A (i.e., where t=0 and t=1). Thus, a cross covariance cannot be determined for the first row of matrix A (where t=0), because no previous row exists.

In one embodiment of the present invention, the cross covariance for the first row is determined by copying the cross covariance of the second row. It should be readily apparent to those skilled in the art, however, that any of a wide variety of methods may be used to calculate the cross covariance for the first row. For example, the system may have a predetermined vector which is always utilized for the first covariance.

The autocorrelation vectors of matrix A have a peak at the location of the estimate of the pitch for their respective frames. By utilizing the covariances the changes in pitch over time is seen (i.e., the tone). The cross covariance C(s,t) of two particular frames has a peak for the lag(s) which aligns the peaks of the autocorrelation coefficients. For example, if the highest peak in the autocorrelation is in the same position in two successive frames, then C(s,t) has its peak at s=0. In other words, C(s,t) peaks at s=0 when the tone is steady (or non-existent). Similarly, C(s,t) peaks at negative values of s when the tone is falling and positive values of s when the tone is rising.

Thus, it can be seen that the covariances C(s,t), as generated according to the above-described method, indicate the tone of the utterance. Thus, by utilizing the covariances C(s,t) in the modeling process, a tone-sensitive modeling process is created.

In addition, the absolute values of C(s,t) tend to be larger during voiced speech (which is also when the absolute value of autocorrelations tends to be larger) and smaller during unvoiced speech or silence. Thus, the covariances C(s,t) generated above assist in determining both the tone of the utterance and periods of silence within the utterance.

After calculating the matrix C, the values for each frame t (i.e., C(s,t) for each t) is appended to the acoustic vector for frame t, step 640. This results in appending a vector of dimension S1–S2+1 to the acoustic vector, thereby creating a larger, feature vector. In one implementation of the present invention, the feature vector is generate by concatenating the acoustic vector for frame t and the covariance vector (i.e., C(s,t)) for frame t. The information in the feature vector thus indicates to the modeling process the tone for each frame and can be used by the modeling process accordingly.

It should be noted that the process of FIG. 6 generates a pitch value for each frame of the utterance, analogous to the discussion above with reference to FIG. 5. This embodiment relies on the acoustic modeling to utilize the acoustic vector portion of the feature vector to determine whether the frame represents silence or speech.

As mentioned above, the processes of FIGS. 5 and 6 may be used independently or in combination. That is, the process of FIG. 5 could be used to generate a pitch parameter to append to the acoustic vector. In addition, the process of FIG. 6 could be used to generate an additional vector to add to the acoustic vector. Thus, a larger feature vector could be generated by appending the pitch parameter from FIG. 5 and the additional vector from FIG. 6 to the acoustic vector.

CONSTRUCTION OF TONE-DEPENDENT ACOUSTIC MODELS

Figure 7:
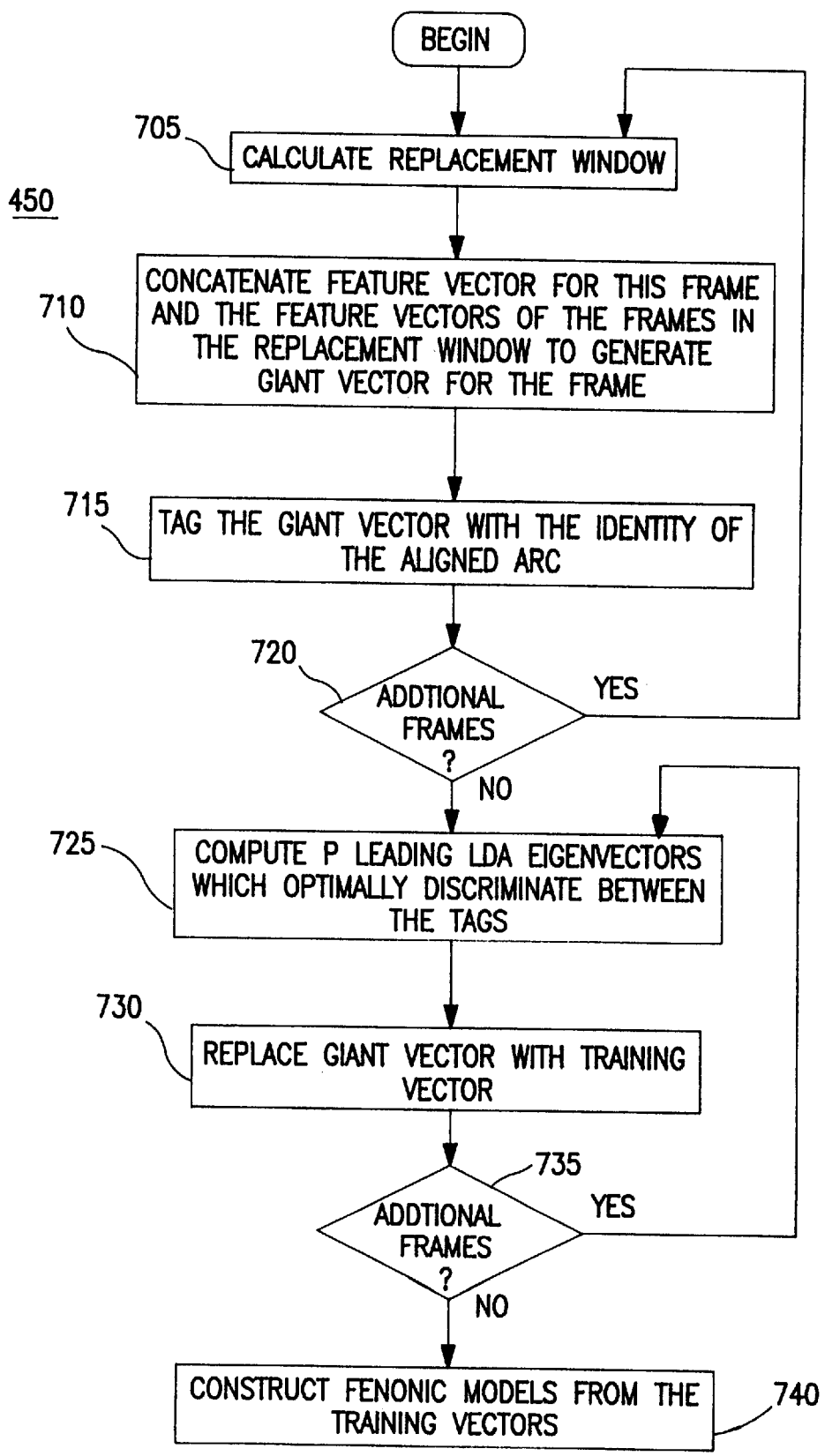
FIG. 7 is a flowchart depicting the process of constructing tone-dependent acoustic models according to the present invention.

FIG. 7 is a flowchart depicting the process of constructing tone-dependent acoustic models (step 450 of FIG. 4) in one embodiment of the present invention. The utterance has already been input into the system of the present invention and aligned against phonetic Markov models, e.g. by utilizing the Viterbi algorithm.

In general, the method discussed below modifies the pre-existing feature vectors associated with phonetic models. That is, a feature vector, as generated above, is associated with each frame of the utterance, and each frame of the utterance is associated with an arc of a phonetic model (as determined by the Viterbi algorithm). These feature vectors are then used to train fenonic models, thereby incorporating tone-dependent parameters from the input data.

The discussion below describes training fenonic models. However, the teachings of the present invention may also be utilized to train refined phonetic models. Those skilled in the art will understand that the tone-sensitive parameters described above can be utilized to train phonetic models, such as by using the well-known Baum-Welch algorithm or Viterbi training.

For each frame in the utterance, a "replacement window" of a predetermined size is first determined, step 705. The replacement window for a given frame is defined as a number of frames surrounding that particular frame. For example, a replacement window of x frames for a given frame comprises that particular frame, ((x/2)–1 frames preceding that particular frame, and ((x/2)–1) frames succeeding that particular frame.

In one embodiment of the present invention, the replacement window is nine frames (i.e., 90 ms). Thus, the replacement window for a particular frame is defined as that particular frame, the four preceding frames, and the four succeeding frames. It will be appreciated that the value of nine frames is exemplary only; any of a wide range of values could be utilized for the replacement window.

After determining the replacement window for a particular frame, the feature vectors of the frames in the replacement window (which includes the feature vector of this particular frame) are concatenated together, step 710. This concatenation creates a larger "giant" vector associated with this particular frame. For example, the giant vector associated with frame 10 would be a concatenation of the feature vectors of frames 6 through 14, given a replacement window of nine frames. In one embodiment of the present invention, the feature vectors are concatenated as they exist in the time dimension; that is, the feature vector of frame 7 is appended to the end of the feature vector of frame 6, the feature vector of frame 8 is appended to the end of the concatenated feature vectors of frames 6 and 7, etc.

It will be understood by those skilled in the art that under certain circumstances a replacement window as described above cannot be calculated. For example, for the first frame in an utterance, no previous frames exist; analogously, for the last frame in an utterance no subsequent frames exist. In one embodiment of the present invention, this problem is resolved by using the feature vector of this particular frame as the feature vector for the missing frame(s). In an alternate embodiment, the feature vector of the frame closest to the missing frame(s) is used as the feature vector for the missing frame(s). Other methods of resolving this problem are within the spirit and scope of the present invention, and will be comprehended by those skilled in the art.

The giant vector associated with this particular frame is then tagged with the identity of the phonetic arc the original vector was aligned with, step 715. That is, the giant vector which is associated with a particular frame is tagged with the identity of the phonetic arc in the Markov model that the frame is aligned with.

The above process is repeated for each frame in the utterance, as shown by step 720. Thus, a tagged giant vector is determined for each frame in the utterance.

Then, using linear discriminant analysis (LDA) the eigenvectors which optimally discriminate between the tags generated above are determined, step 725. That is, the eigenvectors which are the solution to the eigensystem which maximizes the total variance and minimizes the within-class variance are determined, where the tags (i.e., the arcs), define the classes. Eigensystems and the generation of eigenvectors are well known to those skilled in the art, and thus will not be discussed further.

The P leading eigenvectors which optimally discriminate between the phonetic arcs are then selected. The "leading" eigenvectors are defined as those eigenvectors which have the largest eigenvalues. In one embodiment of the present invention, P is predetermined to be in the range of 20 to 50. However, it will be appreciated by those skilled in the art that P can have any value ranging between one and the full dimension of a giant vector. The determination of these eigenvectors is performed in a manner well-known in the art.

The giant vector associated with each frame is then replaced by a training vector for that frame, step 730. The training vector is determined based on this particular giant vector and the P leading eigenvectors calculated in step 725. This is shown by the following formula:

$$\text{Training Vector} = [E]\cdot[X] \quad (7)$$

where [E] represents a matrix of the P leading eigenvectors (and thus has P rows), and [X] represents the giant vector for this particular frame. The resultant training vector is the dot product of [E] and [X], and has a dimension of P.

Steps 725 and 730 are repeated for each frame in the utterance, as shown by step 735. Thus, a training vector is determined for each frame in the utterance which includes tone-dependent data. These training vectors are used to construct fenonic models which are tone-dependent, step 740. Construction of these fenonic models is described in more detail below in FIGS. 8 through 11D

CONSTRUCTING FENONES AND FENONIC MODELS

Figure 8:
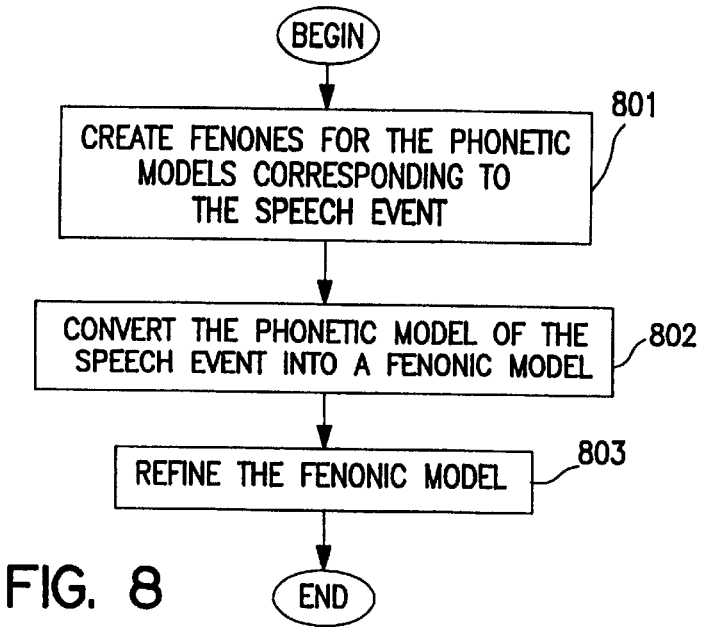
FIG. 8 is a flowchart depicting the process of creating fenones according to the present invention.

FIG. 8 illustrates one embodiment of the process for constructing continuous parameter fenonic Markov models according to the present invention. Referring to FIG. 8, the process for building continuous parameter fenonic Markov models begins by creating fenones for the Markov model (processing block 801). These fenones express the Markov model in operable units. This allows these fenones to be used as building blocks. Next, the phonetic model of the speech event is converted from a model based on the dictionary defined pronunciation into a fenonic model (processing block 802). In other words, the model defined according to a dictionary pronunciation is modified using the fenones created at processing block 801. Then, the fenonic model is refined to produce a better model for the speech art (processing block 803). In the present invention, this represents changing, replacing or removing fenones in the initial fenonic model. The results of such modifications to the fenonic model may result in the model being expanded, condensed or remaining the same length.

It should be noted that the fenones utilized in the present invention are described in connection with a continuous parameter process, as opposed to the discrete parameter fenones of the prior art that are associated with labels. In the present invention, the fenones are associated with acoustic vectors, not labels.

Figure 9:
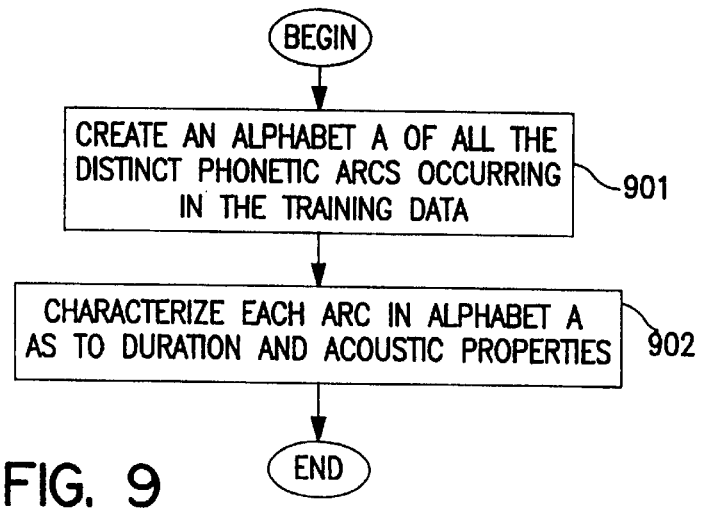
FIG. 9 is a flowchart of the characterization process of the present invention.

Once training data has been obtained through such steps as recording speech, performing signal processing to obtain acoustic vectors, performing Viterbi alignment, and generating tone-sensitive training vectors, fenones are created for the Markov models. FIG. 9 illustrates a flow chart of one embodiment of the process for creating fenones for the Markov models. Referring to FIG. 9, initially an alphabet of all of the distinct phonetic arcs occurring in the training data is created (processing block 901). Then each fenone in the alphabet of distinct fenones is characterized with respect to duration and acoustic properties (processing block 902).

In a typical system, the number of distinct arcs can range from anywhere between 200 to 20,000 depending on the sophistication of the acoustic model. The present invention produces a fenone for each of these distinct arcs. Each of the fenones models tiny fragment of speech. Each fenone is defined in one-to-one correspondence with the arcs.

In one embodiment, all of the fenones have the same topology. However, the fenones may have different topologies. Each arc in a fenone is acoustically identical. The actual number of arcs in a fenone may be more than two. For instance, there may be four or five arcs in a fenone.

After a fenone has been defined for each distinct arc, the present invention characterizes each fenone by duration and its acoustic properties. The duration is described according to the number of frames for which the fenone is expected to endure, i.e. how long the fenone is to last. A probability is associated with every arc in a fenone. The probability indicates the likelihood that the arc will be taken at any given instance in time. Therefore, in the present invention, transition probabilities are assigned to each arc in each fenone. The cumulative total for all transition probabilities between successive states in a fenone is 100 percent.

The relative size of the probabilities chosen for each arc in a fenone affects its duration. If a high transition probability is associated with a self-looping arc in a fenone, the duration of the fenone will be long because the self-looping arc is taken a high percentage of the time. On the other hand, if a high transition probability is associated with an arc that travels between two distinct states, then the fenone will have a short duration because there is a high probability that the arc will be taken.

In the present invention, the transition probabilities may initially be chosen arbitrarily. For each of the arcs, any transition probability greater than 0.05 may be used. The transition probabilities for all arcs leaving a particular state should cumulate to 100 percent probability. In one embodiment, all of the arcs may be assigned the same transition probability. Since a fenone should endure for one frame on average, the arc representing the transition from the beginning state of the fenone to its ending state may be assigned a higher probability, thereby indicating the path that is most likely to be taken.

It should be noted that the transition probabilities do not have to be actual probabilities. In the present invention, once the fenonic model has been created, the actual transition probabilities may be ascertained. If this is desired, the process of the present invention may be repeated using the real transition probabilities. However, at this stage in constructing the fenonic model, any reasonable numbers may be used for the transition probabilities for the arcs in the fenone.

Next, the acoustic properties of each of the fenones must be ascertained. In the prior art, the acoustic properties of fenones are described by multinomial distribution, wherein the types of acoustic labels for each fenone that are expected to be received by the signal processor are derived. In the present invention, a mixture of Gaussian distributions is associated with each fenone. Each of the fenones models the feature vectors described above, which include p-dimensional acoustic vectors. Therefore, the fenonic distribution is a mixture of p-dimensional Gaussian distributions. In some embodiments, p may be between 8 to 50, depending on the type of signal processing being used. The Gaussian distribution indicates the average value of the vectors and how the particular vector varies about the average. A single Gaussian distribution may be used to describe the average value and the variation about the average value. However, because acoustics are so complicated a single Gaussian does not model fenones well. Therefore, two or more Gaussians may be more representative of the actual acoustics.

In the present invention, the Gaussian distributions are obtained from the original arcs in the original phonetic models. This is due to the fact that in the present invention, the fenones are defined in a 1-to-1 correspondence with the arcs in alphabet A. Therefore, by examining the Gaussian model for an arc in the original model, the corresponding fenone for a particular arc inherits the acoustic properties as its own . In actuality, the Viterbi alignment depicts which frames correspond to a particular arc. Using the Viterbi alignment, all frames associated with a specific arc are identified.

Figure 10:
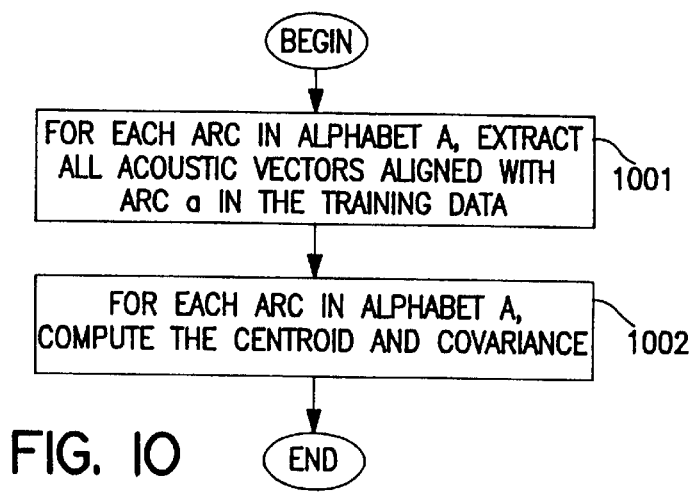
FIG. 10 is a flow chart of the process to define the acoustic properties of each of the fenones according to the present invention.
Figure 11A:
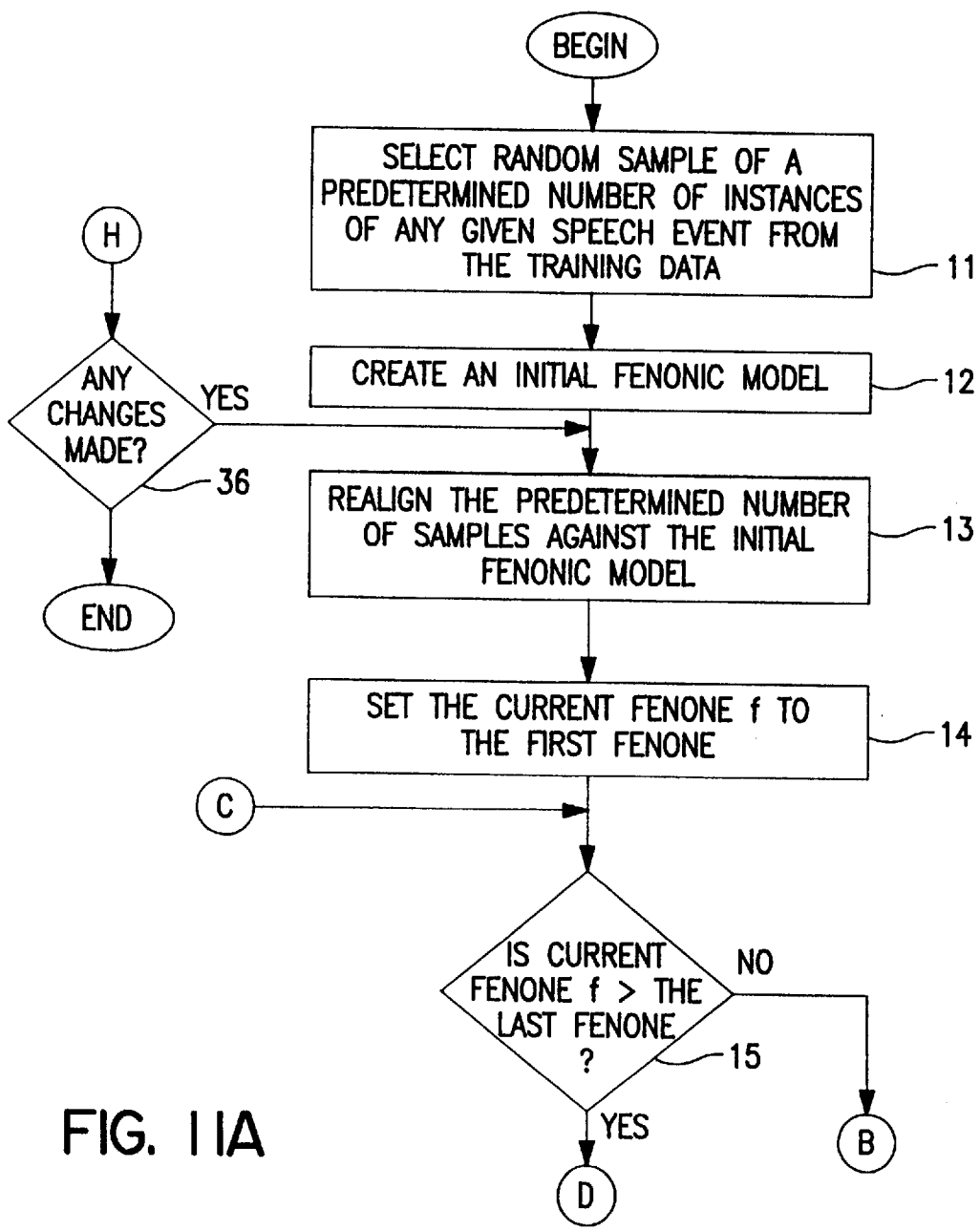
FIGS. 11A–11D are flowcharts depicting the process of the present invention for constructing a fenonic Markov model from an alphabet of fenones.
Figure 11B:
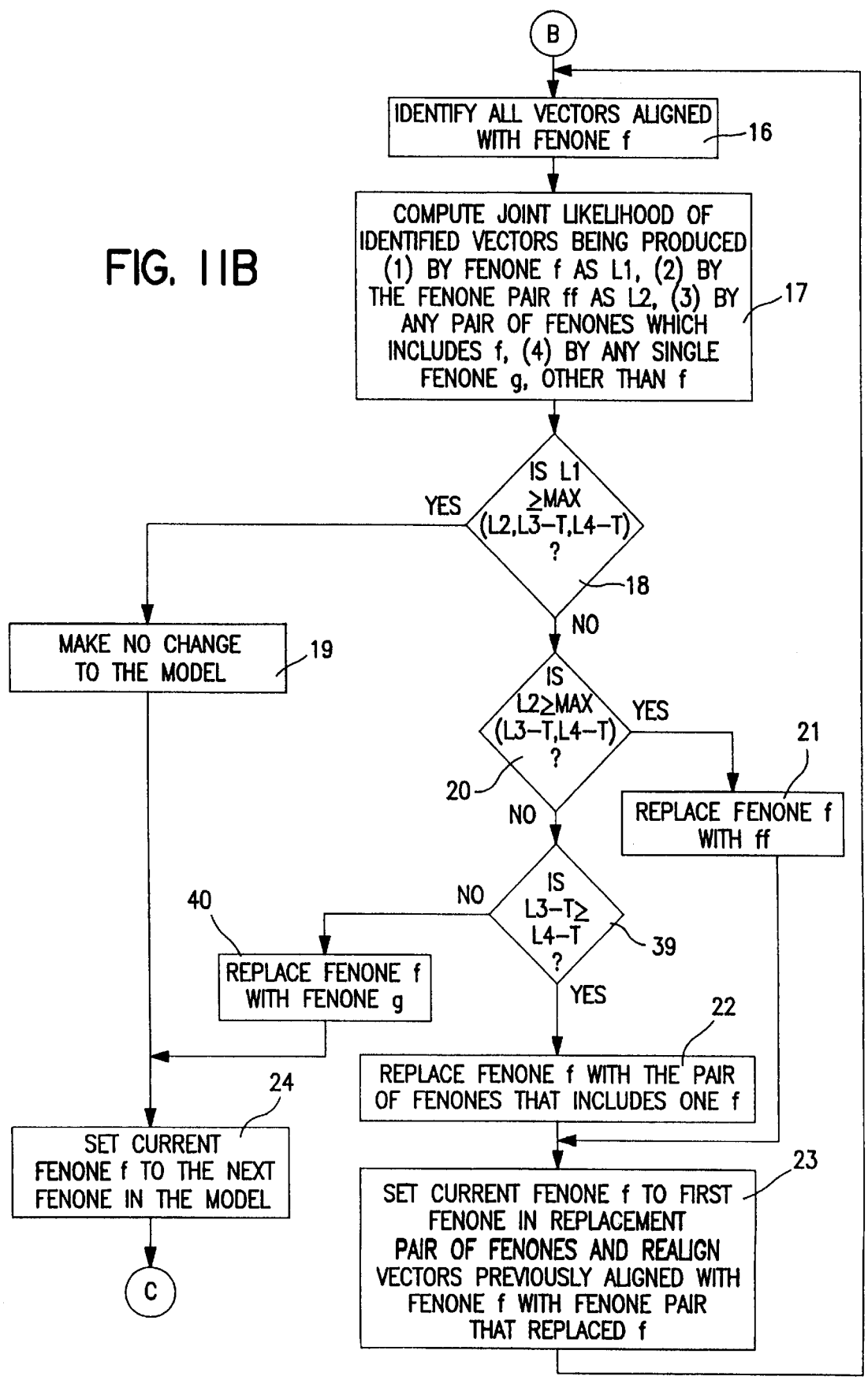
Figure 11C:
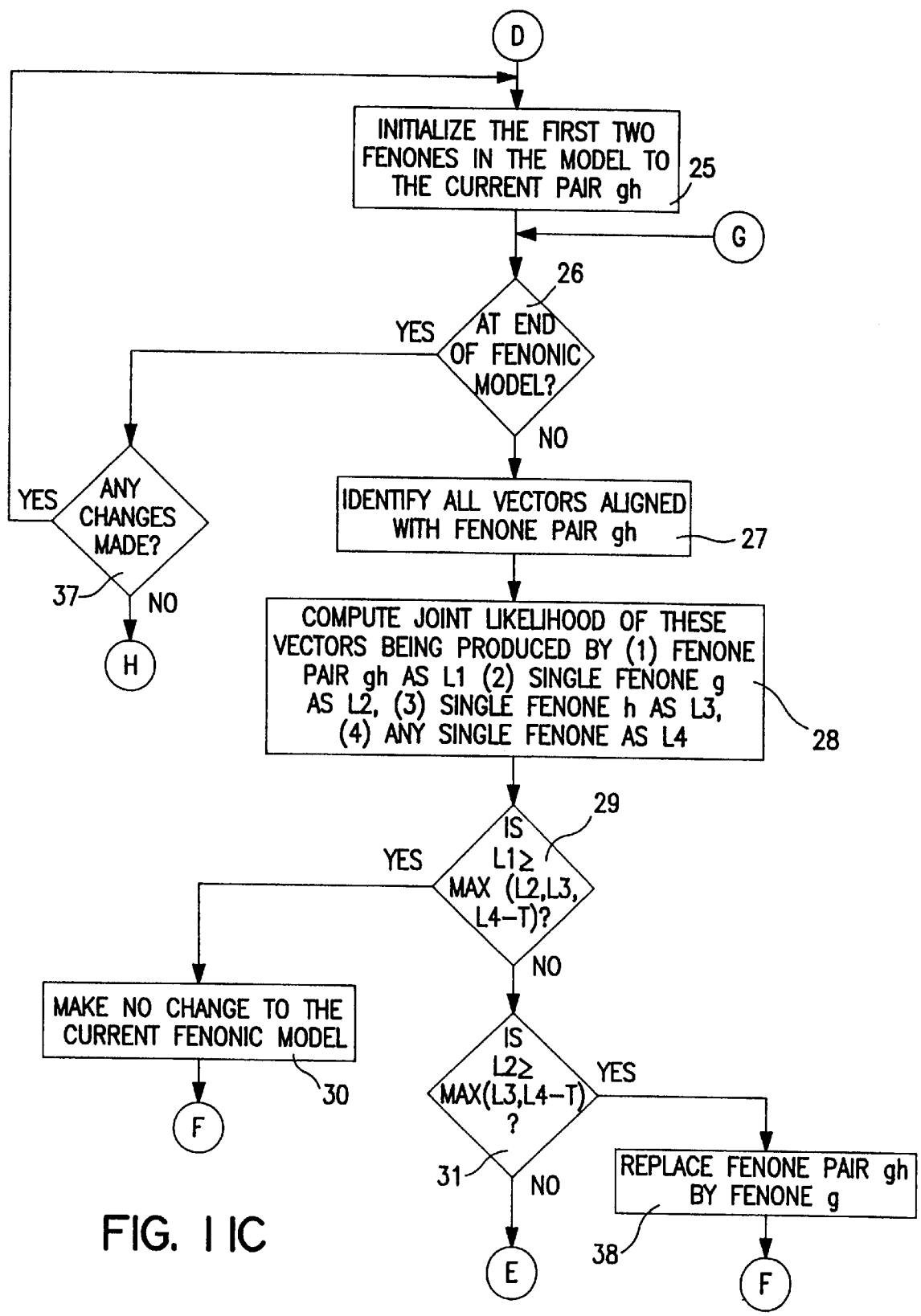
Figure 11D:
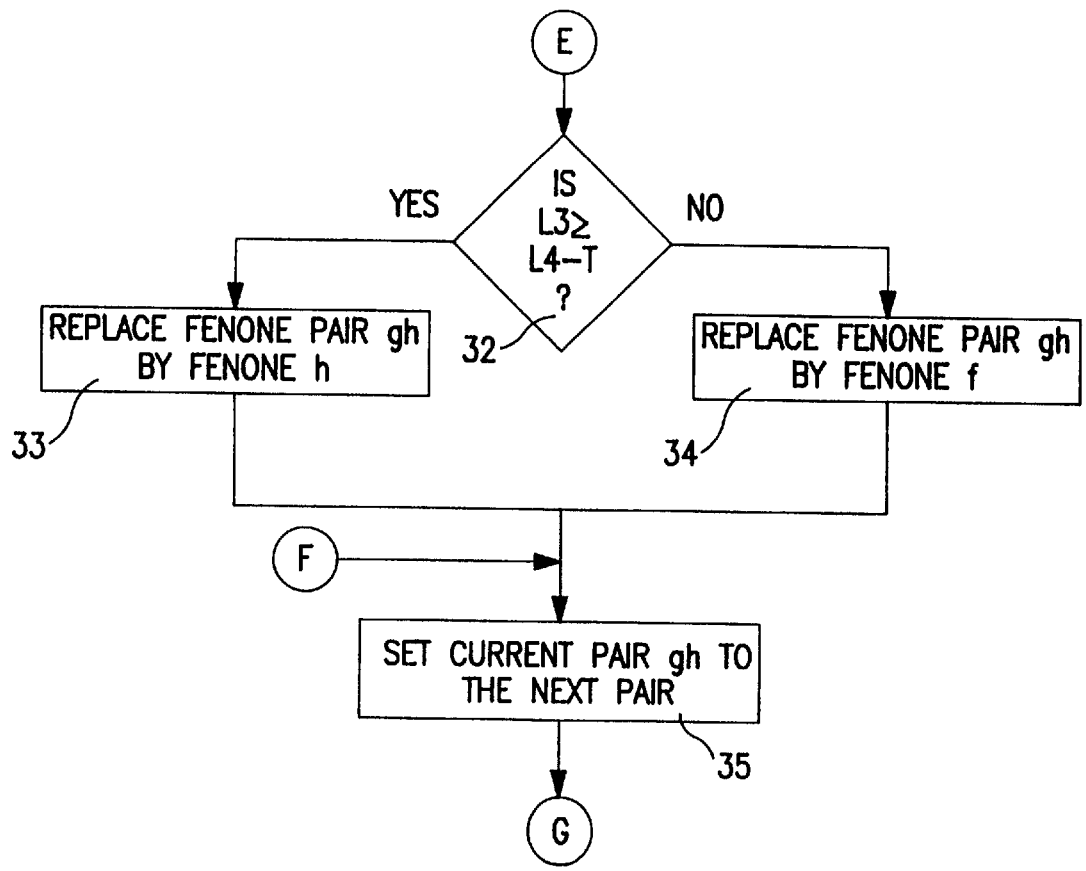

FIG. 10 illustrates one embodiment of the process of the present invention for obtaining the acoustic properties for each of the fenones. Referring to FIG. 10, to obtain the acoustic properties for a fenone, all of the training vectors aligned with the corresponding phonetic arc are extracted from the training data (processing block 1001). Note that these training vectors are tone-dependent, as described above. These training vectors are then clustered into n clusters, where n is a predetermined number (processing block 1002). In one embodiment, these training vectors are created using k-means clustering.

The value of n indicates the number of Gaussians and may be in the range of 3000/N to 10000/N, where N is the number of distinct phonetic arcs occurring in the training data. In k-means clustering, all of the extracted vectors are allocated into n groups.

Then the centroid and covariance matrix for each of the n clusters is computed (processing block 1002). The centroid corresponds to the average value of the vectors in the cluster, while the covariance matrix represents the variance from the average value. For computational efficiency, diagonal covariance matrices are usually preferred to full covariance matrices. The mixture of Gaussian distributions are the determined by computing the average value and variance (or standard deviation) for each of the n groups. Thus, each Gaussian distribution comprises a mean vector and a covariance matrix. Therefore, if a mean vector and covariance matrix is calculated for each of the n groups, then there will be n mean vectors and n covariance matrices, all of which represent the mixture of Gaussian distributions.

Therefore, to reiterate, all that is required to produce the mixture of Gaussians is a Viterbi alignment, k-means clustering and then a computation of the mean and covariance matrix for each of the clusters.

It should be noted that if the training vectors elements are approximately uncorrelated, such as the case with LDA or PC eigenvectors, then Euclidean distance may be used to cluster the vectors. Alternatively, Gaussian log likelihood may be used.

After the Gaussian distributions have been completed, an alphabet of fenones is defined in a one-to-one correspondence with the arcs in alphabet A of distinct phonetic arcs occurring in the training data. Each fenone is represented by an elementary Markov model which can have any conventional topology, such as any described by L. R. Bahl et al., in "Acoustic Markov models used in the Tangora speech recognition system," Proc. ICASSP 1988, pages 497–500. The output distribution associated with each fenone is a mixture of Gaussian distributions specified by the centroids and covariance matrices obtained from the corresponding arc in the alphabet of distinct phonetic arcs in the training data. Furthermore, each arc in the fenone is assigned a transition probability.

CONSTRUCTING A FENONIC MODEL

Once fenones have been created, a fenonic model for any given speech event can be constructed. The fenonic model for the given speech event is created using the phonetic model of the event. The present invention provides a process to improve the phonetic model of the speech event using the fenones created above. This improvement process is performed on an "arc-by-arc" basis. The process is illustrated in a flow chart in FIGS. 11A–D.

The present invention selects a random sample of a predetermined number K of instances of any given speech event from the input data (processing block 11). The predetermine number K may be any reasonable number. For example, 50–100 instances of the speech event may be used.

Next, an initial fenone model is created (processing block 12). In the present invention, the initial model is created using the phonetic alignment. Each distinct arc in the original phonetic sequence of the model of the speech event is replaced by a fenone. The replacement is performed according to which fenone maximizes the joint likelihood of all the feature vectors aligned with each particular phonetic arc in the samples of the predetermined instances. The resulting sequence of fenones comprises the initial fenonic model for the speech event.

The indication of which fenone best models a particular sample of feature vectors may be obtained from the Viterbi alignment. The Viterbi alignment indicates not only the alignment between the sample data and the model, but also scores how well the data matches the model. The forward pass algorithm may be used to give a score to every fenone in the set of fenones that has been created. It should be noted that most often the fenone chosen is the one corresponding to the original phonetic arc. Thus, for the most part, the changes made are subtle.

Specifically, using the instances of the speech event, Viterbi alignment identifies which feature vectors correspond to which phonetic arcs in the original Markov model. It should be noted that some arcs may have one or more vectors associated with them, while other arcs may have none. Once all of the vectors have been assigned to their respective arcs, a fenone is selected for each arc from the alphabet of fenones which best models all of the vectors aligned with that arc. In other words, an acoustic match occurs, such that the fenone that has the highest likelihood of producing all of the vectors is chosen to replace the arc in the model.

Once an initial fenonic model for the speech event has been created, all of the predetermined number K samples are realigned against the fenonic model (processing block 13). Now the model may be modified to further improve the acoustics of the fenonic model. Changes to the model may be needed. One possible reason for refinement changes is that the current fenonic model includes the same alignment as the original phonetic model. The dictionary indicated the phonetic pronunciation and indirectly the number of arcs that existed in the model. In the previous steps, all of the vectors corresponding to a particular arc, were accounted for by one fenone, and the fenones replaced each of those arcs on a one-to-one basis. There may be instances in which it is desirable to separate certain of those fenones into two fenones. Thus, the present invention provides a mechanism by which the alignment inherited from the original phonetic model may be changed. In doing so, the present invention may eliminate any dependence on the phonetic models provided from the dictionary pronunciations.

After realignment (processing block 13), the operations of substitution and insertion are undertaken by the present invention. The current fenone variable f is initialized to the first fenone (processing block 14). Then a test determines if the current fenone is greater than the last fenone in the current fenonic model (processing block 15). In other words, the present invention tests whether the end of the fenonic model has been reached. If the end of the fenonic model has not been reached, then processing continues at processing block 16. On the other hand, if the end of the fenonic model has been reached, then processing continues at processing block 25.

At processing block 16, all of the vectors aligned with the current fenone f are identified. Then the present invention computes the joint likelihood of these vectors being produced by (1) the single fenone f, (2) the pair of fenones ff, (3) or any pair of fenones which includes f, (4) any single fenone g, other than f (processing block 17 ). The pair of fenones may be a pair of fenones in which the fenone f is the first fenone in the pair or is the second fenone in the pair. The resulting log likelihood of these vectors being produced by the single fenone f is denoted L1. The resulting log likelihood of these vectors being produced by the pair of fenones ff is denoted L2. The resulting log likelihood of these vectors being produced by the pair of fenones gh is denoted L3. The resulting log likelihood of these vectors being produce by the fenone g if denoted L4.

After computing the joint likelihoods (processing block 17), a test determines if the likelihood L1 is greater than or equal to the greater of the likelihoods L2, L3-T or L4-T (processing block 18). It should be noted that T represents a predetermined threshold. The threshold T insures that changes are only made when the improvement or benefit received is of a substantial nature. This prevents small changes in performance from always causing substitutions to be made. In the present invention, the threshold T is set equal to the number of samples of the event multiplied by some threshold t. The threshold t may be any one of a number of reasonable numbers. For instance, in one embodiment, threshold t ranges from 0–3. As threshold t is increased, the variety of fenones present in the model is progressively limited. That is, as threshold t increases, runs of identical fenones become more likely. At threshold t equal to zero, the maximum likelihood estimate of the model is obtained, runs are rare, and recognition performance is generally poorer.

If the likelihood L1 is greater than or equal to the greater of the likelihoods L2, L3-T or L4-T, then processing continues at processing block 19 and the fenone is not changed. The current fenone is then set to the next fenone in the sequence of fenones in the fenonic model (processing block 24) and processing continues at processing block 15 for the next fenone.

If the likelihood L1 is not greater than or equal to the greater of the likelihoods L2, L3-T or L4-T, then processing continues at processing block 20. At processing block 20, a test determines whether the likelihood L2 is greater than or equal to the greater of L3-T or L4-T. If so, the fenone f is replaced by the fenone pair ff (processing block 21) and processing continues at processing block 23. If the likelihood L2 is not greater than or equal to the greater of L3-T or L4-T, then processing continues at processing block 39, where a test determines whether the likelihood L3-T is greater than or equal to the likelihood L4-T (e.g., whether L3≧L4 where T is the same). If the likelihood L3-T is greater than or equal to the likelihood L4-T, then the fenone f is replaced with the fenone pair that includes a fenone f (processing block 22) and processing continues at processing block 23. If the likelihood L3-T is not greater than or equal to the likelihood L4-T, then the fenone f is replaced with fenone g (processing block 40) and processing continues at processing block 24).

At processing block 23, the current fenone f is set to the first of the fenones in the pair of fenones that has just been inserted into the fenonic model as a replacement for the single fenone f. In other words, the current fenone f is set to the first fenone f in the replacement fenone pair ff or the first fenone in the replacement pair of fenones that includes one fenone f. Also at processing block 23, the vectors previously aligned with fenone f are realigned (using Viterbi alignment) with the fenones that replaced fenone f. Processing then continues at processing block 16. This essentially repeats the insertion/expansion portion of the fenonic model construction process of the present invention for the newly inserted pair of fenones. If upon performing the comparison with respect to the likelihoods, one or both of the fenones may be expanded themselves; this causes the process of the present invention to be repeated again. The expansion continues until there is no longer any expansion. As currently implemented, the present invention does not continue onto the next fenone in the sequence of fenones in the fenonic model until a fenone is completely finished expanding. The present invention is not limited to such an implementation. In another embodiment, the present invention may perform substitution and insertion one time on each fenone in the fenonic model, and once finished, then repeat the process again and again until no more expansion occurs.

Once the end of the fenonic model has been reached, thereby indicating that any insertion or substitution has been completed, the processing continues at processing block 25 where the present invention allows the fenonic model to shrink using the operation of deletion. The deletion algorithm is similar to the substitution a nd insertion algorithms.

The present invention begins the deletion process by initializing the current pair variable gh to the first two adjacent fenones in the fenonic model (processing block 25). The present invention then tests whether the end of the fenonic model has been reached (processing block 26). The end of the fenonic model has been reached when the adjacent pair of fenones at the end of the fenonic model have already been subject to the deletion process. If the results of the test indicate that the end of the fenonic model has been reached, then processing continues at processing block 37; otherwise, processing continues at processing block 27.

At processing block 27, the vectors aligned with the fenone pair gh are identified. Then the present invention computes the joint likelihood that these vectors could be produced by (1) the pair of fenones gh, (2) the single fenone g, (3) the single fenone h, or (4) any single fenone (processing block 28). The resulting log likelihoods of (1)–(4) are designed L1, L2, L3, and L4 respectively, where the fenone in (4) that maximizes the likelihood of the data is denoted f.

A test then determines if the likelihood L1 is greater than or equal to the maximum of L2, L3 or L4-T, where T is a predetermined threshold (processing block 29). Once again, the threshold T is equal to the number of samples multiplied by a threshold t, where threshold t may be a reasonable value depending on the accuracy of the recognition system. A reasonable value may be a number from 0–3. In one embodiment, the threshold T is the same as used during the substitution/insertion portion. This insures that fenones are not constantly deleted and then reinserted due to differing threshold levels being used in each operation.

If the likelihood L1 is greater than or equal to the maximum of L2, L3 or L4-T, then the fenones in the current fenone pair remain in the fenonic model unchanged (processing block 30) and processing continues at processing block 35. If the likelihood L1 is not greater than or equal to the maximum of L2, L3 or L4-T, then processing continues at processing block 31 where a test determines whether the likelihood L2 is greater than or equal to the maximum of either L3 or L4-T. If the likelihood L2 is greater than or equal to the maximum of either L3 or L4-T, then the fenone pair gh is replaced by the fenone g (processing block 38) and processing continues at processing block 35. On the other hand, if the likelihood L2 is not greater than or equal to the maximum of either L3 or L4-T, then processing continues at processing block 32 where a test determines if the likelihood L3 is greater than or equal to the likelihood of L4-T. I the likelihood L3 is greater than or equal to the likelihood of L4-T, then the fenone pair gh is replaced by fenone h (processing block 33); otherwise, the fenone pair gh is replaced by the fenone f (processing block 34). In either case, after their respective replacements, processing continues at processing block 35.

At processing block 35, the current fenone pair gh is set to the next pair in the fenonic model. In the present invention, the next pair includes the second fenone from the previous pair and the next adjacent fenone in the sequence of fenones in the fenonic model. Processing then continues at processing block 26 so that the deletion process may be repeated for the current pair of adjacent fenones.

If processing block 26 determines that the end of the fenonic model has been reached, such that the last adjacent pair of fenones in the fenonic model were the previous adjacent pair of fenones to undergo the deletion process, then processing continues at processing block 37. At processing block 37, a test determines whether any deletions occurred to the fenonic model during the last iteration of the deletion on each pair of fenones in the fenonic model. Such a determination may be accomplished by examining a flag or a predetermined number of bits (e.g., 1 bit) set in memory whenever a pair of fenones is replaced by a single fenone. If so, then processing continues at processing block 25 and the deletion process is repeated. The deletion process is repeated until there are no more deletions to the fenonic model.

Once deletions are no longer made to the current fenonic model, processing continues at processing block 36, where a test determines if any changes (i.e., substitutions, insertions or deletions) were made during the last iteration of the process. If changes were made, processing continues at processing block 13 where the entire process is repeated again. In this case, the fenonic model again undergoes the alignment operation and the operations of substitution, insertion and deletion are repeated again. If no changes were made, the process ends. Thus, the refinement process of the present invention is repeated until no more changes occur.

To reduce the dependency on the arbitrary transition probabilities chosen previously, the model obtained may be trained using the forward-backward algorithm, and the resulting fenonic transition probabilities substituted as the transition probabilities for the fenonic model. A new estimate of the fenonic model may then be constructed by repeating the steps and optionally repeating the training and construction processes iteratively.

To reduce computation, the search for the best fenone can be restricted to a subset of candidate fenones. For each feature vector v aligned with the arc or fenone being replaced, the fenone F(v) that maximizes the likelihood of vector v is determined. The fenone F(v) i then inserted into the candidate subset. The most likely fenone F(v) associated with any given vector v need only be computed once. This computation may occur ahead of time and be stored. A more thorough search can be conducted, if desired, by inserting a predetermined number (>1) of the most likely fenones for each vector into the candidate list.

SPEECH RECOGNITION USING FENONIC MODELS

Figure 12:
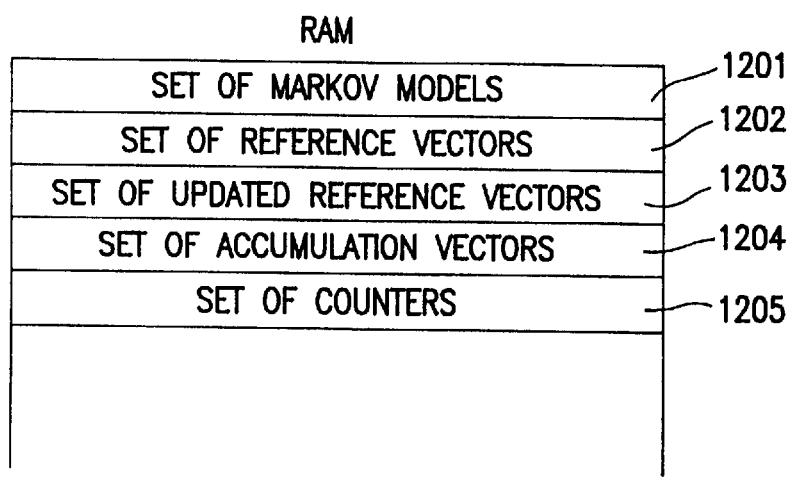
FIG. 12 is a block diagram of the random access memory of FIG. 2.

After the fenonic models are produced, they may be stored in the memory of a computer system for use in speech (or pattern) recognition. Such a system may be the computer system described in FIG. 2. For instance, FIG. 12 shows an example memory unit, random access memory 202 of FIG. 2. Memory 202 shows the storage of a set or array of Markov models 1201, a set or array of reference vectors 1202, a set or array of updated reference vectors 1203, a set or array of accumulation vectors 1204, and a set or array of counters 1205. Note that FIG. 12 is exemplary and is not intended to limit the scope of the present invention. For example, the set of updated reference vectors could alternatively be stored in a storage device 214 of FIG. 2, or the set of Markov models could alternatively be stored in a storage device 214 or a read only memory 213.

Figure 13:
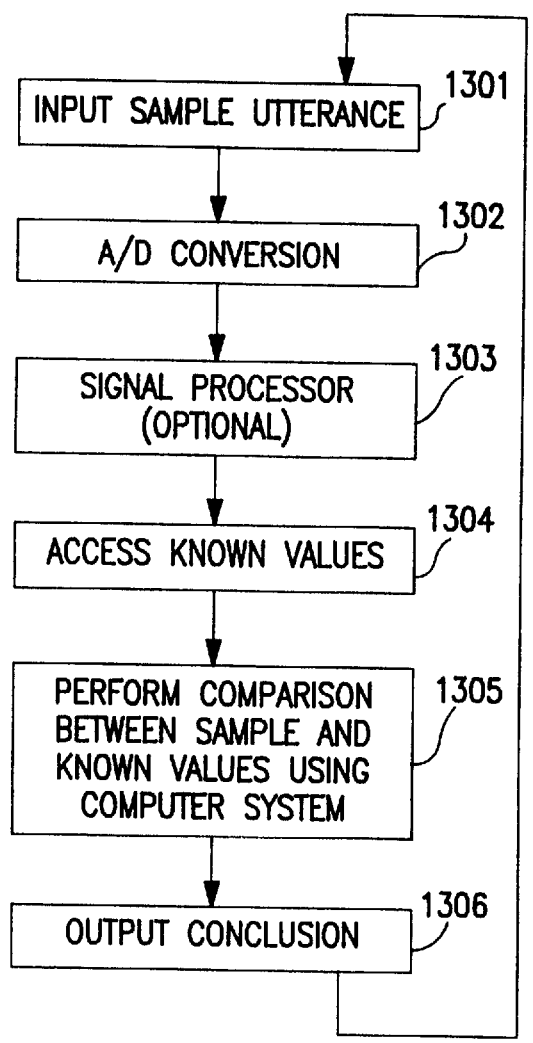
FIG. 13 is a flowchart of the general recognition method of the present invention as processed by a computer system.

FIG. 13 shows a flowchart of the general method used by a computer system of the present invention in recognizing input data. Input utterance data is introduced to the computer system at step 1301. The form of this input may vary, for example, the input may be voice data from a live speaker or a recorded voice. Upon receiving input, for example an utterance from an individual, the system transforms the analog voice data signals to digital form at step 1302, which can be processed by the computer system of the present invention.

In step 1303, the utterance (in digital form) is processed. A specialized signal processor is optional; for example, if the computer system contains signal processor 211 it may be employed to process the utterance, thereby alleviating the central processor 201 of the task. In systems where no signal processor exists, or one exists but is not utilized, the central processor 201 must perform the task. Regardless of which processor performs the task, the utterance (in digital form) is processed by being sliced in equal increments along the time dimension. Typically, the utterance is signal divided into 100 slices per second, thereby creating 100 slices of equal duration. However, the duration of a single slice may vary from system to system and the duration given above is exemplary and not intended to limit the scope of the present invention. Furthermore, it will be understood by those skilled in the art that the utterance can be sliced in unequal increments along the time dimension.

Each slice is then converted into a vector, referred to as an observed vector, the creation of which is well known in the art. An observed vector, in one form, represents a summary of the utterance data for a given time slice. For instance, such a vector may consist of signal intensity or numerical energy data over a given set of frequency ranges. However, the types of observed vectors known to the art and their formats are great and any number will operate effectively within the scope and spirit of the present invention.

It should be noted that in the present invention, the observed vectors are further modified to include tone-sensitive parameters in step 1303. These tone-sensitive parameters are generated a discussed above with reference to FIGS. 5 and 6.

In step 1304, the present invention directs the computer system to access known values which are stored in a memory unit 202 or other storage device of the system. These known values consist of a set of fenonic Markov models and reference vectors, such as Gaussian means, both of which are well known in the art. One or more of the reference vectors is associated with each arc of each Markov model.

At step 1305 the present invention directs the computer system to compare the utterance, represented by the set of observed vectors (including tone-sensitive parameters), to the set of fenonic Markov models. This comparison is done using any of a variety of procedures well known in the art, such as the Viterbi procedure, which determines the best path of an unknown utterance through the given set of Markov models. The Viterbi procedure also associates the unknown vectors of the unknown utterance to particular arcs of the Markov models. This information will be read by the present invention to associate a given observed vector to a set of reference vectors.

In one embodiment of the present invention, an adaptation process also occurs at step 1305. In this embodiment, the present invention updates the set of reference vectors corresponding to the identified Markov model to more closely resemble the observed vectors. The adaptation process is described in co-pending application, filed on Sep. 30, 1993, Ser. No. 08/129,679, entitled "Continuous Reference Adaptation In A Pattern Recognition System", which is assigned to the assignee of the present invention.

The present invention utilizes the updated reference vectors when processing subsequent input utterances. That is, when the present invention is comparing a subsequent utterance to the set of Markov models, the reference vectors corresponding to the Markov models used by the comparison procedure, such as the Viterbi procedure, will be the updated reference vectors rather than the original reference vectors. Thus, the present invention will be able to better match subsequent utterances to the Markov models.

The result of the comparison is output at step 1306. This output is the single Markov model that is the closest match to the set of observed vectors. It should be noted that no guarantee exists that the resultant model is the correct interpretation of the utterance. The resultant model is the one model in the set of models with the highest probability of accuracy; however, the interpretation will be correct the overwhelming majority of the time.

In an alternate embodiment of the present invention, the output at step 1306 is a predetermined number of "best" models. The "best" models are those Markov models which are the closest matches to the set of observed vectors. It will be understood by those skilled in the art that this predetermined number of "best" models could be any value less than the total number of models in the system. However, it will be appreciated that very large values are of minimal worth.

The output step 1306 encompasses a broad range of possibilities. For example, the system may output the data in visual form over the display device 215, in audio form over the speaker included in communication interface 218, or storage format in storage device 214 or random access memory 212 of FIG. 2. Another potential output is the execution of a command, for example running an application program, opening or closing a particular data file, performing a maneuver in a running application such as a game, or shutting off the computer.

After outputting the results of the comparison at step 1306, the present invention returns to step 1301 and awaits further input.

It should be noted that the process for constructing fenonic Markov models, according to the present invention may be implemented in software for use on a computer system to allow applications developers to produce speech sensitive programs.

Thus, the present invention utilizes the alignment provided by the phonetic model of a speech event and the data driven approach to change the arcs in the phonetic model where it is appropriate to change them. Therefore, the present invention uses both the dictionary and the data driven approaches in combination.

In addition, the present invention employs a continuous parameter acoustic vector and a mixture of Gaussian distributions to determine the match between a vector and a fenone, instead of using labels such as discrete parameter models in the prior art. In discrete parameter models, each label represents a region of acoustic space that is described using multinomial distributions. Knowing the label indicates the region in which the vector lies, but not whereabouts in the region it lies This loss of precision is often referred to as quantization error. Thus, by using labels, the acoustic space is quantized into "chunks". The label-based models are characterized by multinomial distributions and quantization errors.

On the other hand, the present invention uses continuous parameter Markov models (i.e., vector-based Markov models). The present invention uses continuous parameter fenones characterized by continuous distributions, such as Gaussian distributions. These Gaussian distributions do not suffer from the quantization errors that occur in conjunction with discrete parameter models. Applying the same rationale, the present invention uses continuous-valued acoustic vectors to represent utterances, not acoustic labels.

In addition, the present invention constructs fenonic models which are tone-dependent. This tone-dependency leads to improved recognition capabilities in tone-sensitive languages.

It should be noted that alternate methods of generating fenonic models utilizing the training vectors described above may also be employed within the scope and sprit of the present invention. One such training method is described in U.S. Pat. No. 4,819,271, entitled "Constructing Markov Model Word Baseforms From Multiple Utterance; by Concatenating Model Sequences for Word Segments," issued on Apr. 4, 1989 to L. R. Bahl et al.

In addition, it will be appreciated that the use of tone-dependent feature vectors as described herein is applicable to acoustic modeling techniques in general, and is not limited to fenonic models. For example, the tone-dependent feature vectors taught in the present invention could be utilized in phonetic modeling techniques.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for one-sensitive acoustic modeling has been described.

What is claimed is:

1. A method for generating a tone-dependent acoustic model comprising the steps of:

(a) generating a plurality of acoustic vectors representing a plurality of input data frames;

(b) generating a plurality of tone-sensitive parameters corresponding to said data frames;

(c) creating a plurality of feature vectors corresponding to said data frames by appending said plurality of tone-sensitive parameters to said plurality of acoustic vectors; and (d) creating an acoustic model from said plurality of feature vectors.

2. The method as defined in claim 1 wherein each of said data frames corresponds to a single vector of said feature vectors.

3. The method as defined in claim 1 wherein said data frames represent sampled frames of speech.

4. The method as defined in claim 1, wherein each of said tone-sensitive parameters corresponds to a single frame of said input data frames.

5. The method as defined in claim 1, wherein said step (b) comprises detecting pitch values.

6. The method as defined in claim 5, wherein said step (b) further comprises the steps of:

detecting whether a pitch value is present in each of said data frames; and determining a pitch value for each of said input data frames.

7. The method as defined in claim 6, wherein for a first frame of said data frames, said step of determining pitch values further comprises the steps of:

using said pitch value detected for said first frame, provided said pitch value is present in said first frame; and generating a pitch value for said first frame based on detected pitch values of surrounding frames, provided said pitch is not present for said first frame.

8. The method as defined in claim 6, wherein said step (c) comprises appending said pitch values to said acoustic vectors for said data frames.

9. The method as defined in claim 1, wherein said step (b) comprises the steps of:

determining autocorrelation coefficients for each of said data frames; and determining cross covariances between the autocorrelation coefficients of adjacent data frames.

10. The method as defined in claim 9, wherein said step (c) comprises appending said cross covariances to said acoustic vectors.

11. The method as defined in claim 10, wherein said step (b) further comprises the steps of:

detecting whether a pitch value is present in each of said data frames; and determining a pitch value for each of said input data frames.

12. The method as defined in claim 11, wherein said step (c) further comprises appending said pitch values to said acoustic vectors for said data frames.

13. The method as defined in claim 1, wherein said step (d) comprises the steps of:

creating training vectors based on said feature vectors; and constructing acoustic models using said training vectors.

14. The method as defined in claim 13 wherein said creating step comprises the steps of:

concatenating each of said feature vectors with surrounding feature vectors to generate a giant vector corresponding to each of said feature vectors;

associating the giant vector with an aligned arc corresponding to said feature vector;

computing eigenvectors which optimally discriminate between said arcs; and calculating the dot product of the eigenvectors and the vector representing the input data frame.

15. A method generating tone-sensitive vectors representing frames of input data from which acoustic models can be created, said method comprising the steps of:

(a) creating an acoustic vector for a first frame of said input data;

(b) determining a pitch value for said first frame; and (c) appending said pitch value to said acoustic vector for said first frame.

16. The method as defined in claim 15, wherein said determining step comprises:

using the pitch value detected by a pitch detector for said pitch value for said first frame, provided said pitch value is present in said first frame; and generating a pitch value for said first frame based on detected pitch values of surrounding frames, provided said pitch is not present for said first frame.

17. A method of generating a tone-sensitive feature vector for use in a speech recognition system representing a first frame of input data, wherein said input data comprises multiple frames, said method comprising the steps of:

(a) determining autocorrelation coefficients for each of said multiple frames;

(b) determining a cross covariance between the autocorrelation coefficients for said first frame and a second frame of said multiple frames; and (c) appending said cross covariance to an acoustic vector for said first frame.

18. The method as defined in claim 17 wherein said step (a) comprises determining autocorrelation coefficients for a predetermined number of lags.

19. The method as defined in claim 17 wherein said step (b) comprises determining said cross covariance by shifting said second frame relative to said first frame a predetermined amount.

20. A method of generating tone-dependent acoustic models comprising the steps of:

(a) generating feature vectors representing input data frames, wherein each of the feature vectors includes a tone-sensitive parameter;

(b) creating training vectors based on said feature vectors; and (c) constructing acoustic models using said training vectors.

21. The method as defined in claim 20 wherein said creating step comprises the steps of:

concatenating each of said feature vectors with surrounding feature vectors to generate a giant vector corresponding to each of said feature vectors;

associating the giant vector with an aligned arc corresponding to said feature vector;

computing eigenvectors which optimally discriminate between said arcs; and calculating the dot product of the eigenvectors and the vector representing the input data frame.

22. The method as defined in claim 21 wherein said computing step comprises selecting a predetermined number of said eigenvectors.

23. A computer system for generating tone-sensitive acoustic models comprising:

a memory unit;

a data input unit to receive input data frames;

a signal processing unit to generate acoustic vectors representing said input data frames; and a processing unit to,
 generate tone-sensitive parameters corresponding to said input data frames,
 create feature vectors corresponding to said input data frames by appending said tone-sensitive parameters to said acoustic vectors, and
 create acoustic models from said feature vectors.

24. The computer system as defined in claim 23 wherein said signal processing unit is a signal processor.

25. The computer system as defined claim 23 wherein said signal processing unit is a general purpose processor.

26. A computer-readable medium having stored thereon a plurality of instructions for generating tone-sensitive vectors representing frames of input data from which acoustic models can be created, wherein the plurality of instructions are designed to be executed by a processor for implementing a function to create an acoustic vector for a first frame of said input data, to determine a pitch value for said first frame, and to append said pitch value to said acoustic vector for said first frame.

27. The computer-readable medium as defined in claim 26, wherein said instructions to determine said pitch value for said first frame include instructions to use the pitch value detected by a pitch detector for said pitch value for said first frame, provided said pitch value is present in said first frame, and to generate a pitch value for said first frame based on detected pitch values of surrounding frames, provided said pitch is not present for said first frame.

* * * * *